US012574536B2

(12) United States Patent

Hendry et al.

(10) Patent No.: US 12,574,536 B2

(45) Date of Patent: ***Mar. 10, 2026

(54) SIGNALING OF NON-PICTURE-LEVEL SYNTAX ELEMENTS AT THE PICTURE LEVEL

(71) Applicant: Huawei Technologies Co., Ltd., Guangdong (CN)

(72) Inventors: Fnu Hendry, San Diego, CA (US); Ye-Kui Wang, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,088

(22) Filed: Jul. 9, 2024

(65) Prior Publication Data

US 2025/0016345 A1     Jan. 9, 2025

Related U.S. Application Data

(63) Continuation of application No. 17/701,011, filed on Mar. 22, 2022, now Pat. No. 12,069,284, which is a
(Continued)

(51) Int. Cl.
*H04N 19/44* (2014.01)
*H04N 19/172* (2014.01)
(Continued)

(52) U.S. Cl.
CPC ........... *H04N 19/44* (2014.11); *H04N 19/172* (2014.11); *H04N 19/46* (2014.11); *H04N 19/70* (2014.11)

(58) Field of Classification Search
CPC ...... H04N 19/44; H04N 19/172; H04N 19/46; H04N 19/70; H04N 19/174; H04N 19/105
See application file for complete search history.

(56) References Cited

U.S. PATENT DOCUMENTS 8,891,613 B2     11/2014  Wahadaniah et al.
2012/0050475 A1     3/2012  Tian et al.
(Continued)

FOREIGN PATENT DOCUMENTS

CN     108322754 A     7/2018
RU     2613738 C2     3/2017
(Continued)

OTHER PUBLICATIONS

Martin Pettersson, et al., "AHG17: Parameters in PPS or slice headers," Joint Video Experts Team (JVET) of ITU-T SG 16 WP 3 and ISO/IEC JTC 1 /SC 29/WG 11, JVET-O0238-v3, 15th Meeting: Gothenburg, SE, Jul. 2019, 8 pages.
(Continued)

*Primary Examiner* — Dramos Kalapodas

(74) *Attorney, Agent, or Firm* — Conley Rose, P.C.

(57) ABSTRACT

A method comprises: receiving, by a video decoder, a video bitstream comprising an RPL flag, wherein the RPL flag equal to a first value specifies that RPL signaling is present in a PH, and wherein the RPL flag equal to a second value specifies that RPL signaling is not present in the PH and may be present in slice headers; and decoding, by the video decoder using the RPL flag, a coded picture to obtain a decoded picture. A comprises: receiving, by a video decoder, a video bitstream comprising an SAO flag, wherein the SAO flag specifies that SAO information may be present or is not present in a PH or specifies that the SAO information may be present or is not present in slice headers; and decoding, by the video decoder using the SAO flag, a coded picture to obtain a decoded picture.

20 Claims, 13 Drawing Sheets

600

Receive a video bitstream comprising an RPL flag, wherein the RPL flag equal to a first value specifies that RPL signaling is present in a PH, and wherein the RPL flag equal to a second value specifies that RPL signaling is not present in the PH and may be present in slice headers     / 610

Decode, using the RPL flag, a coded picture to obtain a decoded picture     — 620

Related U.S. Application Data continuation of application No. PCT/US2020/052281, filed on Sep. 23, 2020.

(60) Provisional application No. 62/905,228, filed on Sep. 24, 2019.

(51) Int. Cl.
    H04N 19/46          (2014.01)
    H04N 19/70          (2014.01)

(56)                    References Cited

U.S. PATENT DOCUMENTS

| | | | |
|---|---|---|---|
| 2013/0070841 A1 | 3/2013 | Wahadaniah et al. | |
| 2013/0077685 A1 | 3/2013 | Chen et al. | |
| 2013/0077687 A1* | 3/2013 | Wang | H04N 19/70 |
| | | | 375/E7.243 |
| 2013/0114741 A1 | 5/2013 | Sullivan et al. | |
| 2014/0092991 A1 | 4/2014 | Sullivan et al. | |
| 2014/0334556 A1* | 11/2014 | Shibahara | H04N 19/895 |
| | | | 375/240.27 |
| 2015/0016505 A1* | 1/2015 | Sjoberg | H04N 19/46 |
| | | | 375/240.02 |
| 2015/0078456 A1 | 3/2015 | Hannuksela | |
| 2016/0191933 A1 | 6/2016 | Ikai et al. | |
| 2017/0104990 A1 | 4/2017 | Sjoberg et al. | |
| 2018/0324458 A1 | 11/2018 | Wang et al. | |
| 2023/0396759 A1* | 12/2023 | Zhang | H04N 19/70 |

FOREIGN PATENT DOCUMENTS

| | | |
|---|---|---|
| WO | 2013042329 A1 | 3/2013 |
| WO | 2020112488 A1 | 6/2020 |
| WO | 2021045128 A1 | 3/2021 |

OTHER PUBLICATIONS

Sachin Deshpande, "On Reference Pictures Signaling and Management for VVC," Joint Video Experts Team (JVET) of ITU-T SG16 WP3 and ISO/IEC JTC1/SC29/WG11, JVET-I0450-v2, 12th Meeting: Macao, CN, Oct. 2018, 8 pages.

Hendry, Yet al., "AHG17: On Access Unit Delimiter and Picture Header," Joint Video Experts Team (JVET) of ITU-T SG 16 WP 3 and ISO/IEC JTC 1/SC 29/WG 11, JVET-P0120-v1, 16th Meeting: Geneva, CH, Oct. 2019, 5 pages.

Wade Wan, et al., "AHG17: Picture Header," Joint Video Experts Team (JVET) of ITU-T SG 16 WP 3 and ISO/IEC JTC 1/SC 29/WG 11, JVET-P0239-v1, 16th Meeting: Geneva, CH, Oct. 2019, 10 pages.

"Line Transmission of Non-Telephone Signals Video Codec for Audiovisual Services at p x 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

JVET-S2001-vG, "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 22-Jul. 1, 2020, 546 pages.

"Series H: Audiovisual and Multimedia Systems Infrastructure of audiovisual services—Coding of moving video; Versatile video coding," Recommendation ITU-T H.266, Aug. 2020, 516 pages.

Document: JVET-I0450-v1, Deshpande, S., "On Reference Pictures Signaling and Management for VVC," Joint Collaborative Team on Video Coding (JCT-VG) of ITU-T SG16 WP 3 and ISO/IEC JTC1/SC29/WG11, 12th Meeting: Macao, CN Oct. 3-12, 2018, XP030193927.

Document: JVET-K1001-v6, Briss, B., et al., "Versatile Video Coding (Draft 2)," Joint Video Experts Team (JVET) of ITU-T SG 16 WP 3 and ISO/IEC JTC 1/SC 29/WVG 11, 11th Meeting: Ljubljana, SI, Jul. 10-18, 2018, 141 pages.

Ma, S., et al., "Kernel technologies and applications of AVS2 video coding standard," 10.11959/j.issn.10000801.2017245, Aug. 20, 2017, with an English abstract, 13 pages.

Document: JVET-O0238-v3, Martin Pettersson et al., "AHG17: Parameters in PS or slice headers," Joint Video Experts Team (JVET) of ITU-T SG 16 WP 3 and ISO/IEC JTC 1/SC 29/WG 11 15th Meeting: Gothenburg, SE, Jul. 3-12, 2019, total 6 pages.

* cited by examiner

300

Encoder

400

Decoder

Entropy
Decoding

433

429

Inverse
Transform &
Quantization

421

Motion
Compensation

417

Intra-Picture
Prediction

423

Decoded
Picture Buffer

425

In-loop Filters

Output
Video
Signal

600

Receive a video bitstream comprising an RPL flag, wherein the RPL flag equal to a first value specifies that RPL signaling is present in a PH, and wherein the RPL flag equal to a second value specifies that RPL signaling is not present in the PH and may be present in slice headers    610

Decode, using the RPL flag, a coded picture to obtain a decoded picture    620

700

710

Generate an RPL flag, wherein the RPL flag equal to a first value specifies that RPL signaling is present in a PH, and wherein the RPL flag equal to a second value specifies that RPL signaling is not present in the PH and may be present in slice headers

720

Encode the RPL flag into a video bitstream

730

Store the video bitstream for communication toward a video decoder

800

Receive a video bitstream comprising an SAO flag, wherein the SAO flag equal to a first value specifies that SAO signaling is present in a PH, and wherein the SAO flag equal to a second value specifies that SAO signaling is not present in the PH and may be present in slice headers ⟋ 810

Decode, using the SAO flag, a coded picture to obtain a decoded picture — 820

900

910

Generate an SAO flag, wherein the SAO flag equal to a first value specifies that SAO signaling is present in a PH, and wherein the SAO flag equal to a second value specifies that SAO signaling is not present in the PH and may be present in slice headers Encode the SAO flag into a video bitstream     920

930

Store the video bitstream for communication toward a video decoder

1000

Receive a video bitstream comprising an ALF flag, wherein the ALF flag equal to a first value specifies that ALF signaling is present in a PH, and wherein the ALF flag equal to a second value specifies that ALF signaling is not present in the PH and may be present in slice headers     1010

Decode, using the ALF flag, a coded picture to obtain a decoded picture     1020

1100

1110

Generate an ALF flag, wherein the ALF flag equal to a first value specifies that ALF signaling is present in a PH, and wherein the ALF flag equal to a second value specifies that ALF signaling is not present in the PH and may be present in slice headers

1120

Encode the ALF flag into a video bitstream

1130

Store the video bitstream for communication toward a video decoder

1200

Downstream
Ports

Upstream
Ports

SIGNALING OF NON-PICTURE-LEVEL SYNTAX ELEMENTS AT THE PICTURE LEVEL

CROSS-REFERENCE TO RELATED APPLICATIONS

This is a continuation of U.S. patent application Ser. No. 17/701,011 filed on Mar. 22, 2022, which is a continuation of Int'l Patent App. No. PCT/US2020/052281 filed on Sep. 23, 2020, which claims priority to U.S. Prov. Patent App. No. 62/905,228 filed on Sep. 24, 2019, all of which are incorporated by reference.

TECHNICAL FIELD

The disclosed embodiments relate to video coding in general and signaling of non-picture-level syntax elements at the picture level in particular.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method implemented by a video decoder and comprising: receiving, by the video decoder, a video bitstream comprising an RPL flag, wherein the RPL flag equal to a first value specifies that RPL signaling is present in a PH, and wherein the RPL flag equal to a second value specifies that RPL signaling is not present in the PH and may be present in slice headers.

In the embodiments, syntax elements are included in a picture header when the syntax elements are the same or included in a slice header when the syntax elements vary. However, in some embodiments, the syntax elements may not be included in both. First, non-picture-level syntax elements may be present in the PH. Non-picture-level syntax elements are syntax elements that are at a level of a video bitstream other than the picture level. Second, for each category of non-picture-level syntax elements, a flag specifies when syntax elements of the category are present in the PH or slice headers. The flag may be in the PH. The non-picture-level syntax elements include those related to signaling of RPLs, joint Cb Cr sign flags, SAO tool enabling and parameters, ALF tool enabling and parameters, LMCS tool enabling and parameters, and scaling list tool enabling and parameters. Third, when non-picture-level syntax elements are present in the PH, the corresponding syntax elements shall not be present in any slice of the picture associated with the picture header containing the syntax elements. The values of non-picture-level syntax elements that are present in the PH are applied to all slices of the picture associated with the picture header containing the syntax elements. Fourth, when non-picture-level syntax elements are not present in the PH, the corresponding syntax elements may be present in slice headers of slices of the picture associated with the picture header. By moving signaling of non-picture-level syntax elements to the picture level, redundancy is reduced and there are fewer wasted bits in the encoded bitstream.

Optionally, in any of the preceding aspects, another implementation of the aspect provides that the RPL flag equal to 1 specifies that the RPL signaling is present in the PH.

Optionally, in any of the preceding aspects, another implementation of the aspect provides that the RPL flag equal to 1 specifies that the RPL signaling is not in a slice.

Optionally, in any of the preceding aspects, another implementation of the aspect provides that the RPL flag equal to 0 specifies that the RPL signaling is not present in the PH.

Optionally, in any of the preceding aspects, another implementation of the aspect provides that the RPL flag equal to 0 specifies that the RPL signaling may be present in the slice headers.

Optionally, in any of the preceding aspects, another implementation of the aspect provides that the bitstream further comprises an RPL SPS flag, wherein the RPL SPS flag specifies that RPL i is derived based on one of ref_pic_list_struct(listIdx, rplsIdx) syntax structures with listIdx equal to i in an SPS or specifies that RPL i is derived based on one of ref_pic_list_struct(listIdx, rplsIdx) syntax structures with listIdx equal to i that is directly included.

Optionally, in any of the preceding aspects, another implementation of the aspect provides that the bitstream further comprises an RPL index, wherein the RPL index specifies an index, into a list of ref_pic_list_struct(listIdx, rplsIdx) syntax structures with listIdx equal to i included in a sequence parameter set (SPS), of a ref_pic_list_struct(listIdx, rplsIdx) syntax structure with listIdx equal to i that is used for derivation of RPL i of a current picture.

Optionally, in any of the preceding aspects, another implementation of the aspect provides that the method further comprises displaying the decoded picture on a display of an electronic device.

Optionally, in any of the preceding aspects, another implementation of the aspect provides that when non-picture level syntax elements are present in the PH, corresponding syntax elements shall not be present in any slice of the picture associated with the PH containing the syntax elements.

A second aspect relates to a method implemented by a video encoder and comprising: generating an RPL flag, wherein the RPL flag equal to a first value specifies that RPL signaling is present in a PH, and wherein the RPL flag equal to a second value specifies that RPL signaling is not present in the PH and may be present in slice headers.

Optionally, in any of the preceding aspects, another implementation of the aspect provides that the RPL flag equal to 1 specifies that the RPL signaling is present in the PH.

Optionally, in any of the preceding aspects, another implementation of the aspect provides that the RPL flag equal to 1 specifies that the RPL signaling is not in a slice.

Optionally, in any of the preceding aspects, another implementation of the aspect provides that the RPL flag equal to 0 specifies that the RPL signaling is not present in the PH.

Optionally, in any of the preceding aspects, another implementation of the aspect provides that the RPL flag equal to 0 specifies that the RPL signaling may be present in the slice headers.

Optionally, in any of the preceding aspects, another implementation of the aspect provides that the method further comprises generating an RPL SPS flag, wherein the RPL SPS flag specifies that RPL i is derived based on one of ref_pic_list_struct(listIdx, rplsIdx) syntax structures with listIdx equal to i in an SPS or specifies that RPL i is derived based on one of ref_pic_list_struct(listIdx, rplsIdx) syntax structures with listIdx equal to i that is directly included.

Optionally, in any of the preceding aspects, another implementation of the aspect provides that the method further comprises generating an RPL index, wherein the RPL index specifies an index, into a list of ref_pic_list_struct(listIdx, rplsIdx) syntax structures with listIdx equal to i included in an SPS, of a ref_pic_list_struct(listIdx, rplsIdx) syntax structure with listIdx equal to i that is used for derivation of RPL i of a current picture.

Optionally, in any of the preceding aspects, another implementation of the aspect provides that when non-picture level syntax elements are present in the PH, corresponding syntax elements shall not be present in any slice of the picture associated with the PH containing the syntax elements.

A third aspect relates to a method implemented by a video decoder and comprising: receiving, by the video decoder, a video bitstream comprising an SAO flag, wherein the SAO flag equal to a first value specifies that SAO signaling is present in a PH, and wherein the SAO flag equal to a second value specifies that SAO signaling is not present in the PH and may be present in slice headers; and decoding, by the video decoder using the SAO flag, a coded picture to obtain a decoded picture.

Optionally, in any of the preceding aspects, another implementation of the aspect provides that the method further comprises displaying the decoded picture on a display of an electronic device.

Optionally, in any of the preceding aspects, another implementation of the aspect provides that when non-picture level syntax elements are present in the PH, corresponding syntax elements shall not be present in any slice of the picture associated with the PH containing the syntax elements.

A fourth aspect relates to a method implemented by a video encoder and comprising: generating an SAO flag, wherein the SAO flag equal to a first value specifies that SAO signaling is present in a PH, and wherein the SAO flag equal to a second value specifies that SAO signaling is not present in the PH and may be present in slice headers; encoding, by the video encoder, the SAO flag into a video bitstream; and storing, by the video encoder, the video bitstream for communication toward a video decoder.

Optionally, in any of the preceding aspects, another implementation of the aspect provides that when non-picture level syntax elements are present in the PH, corresponding syntax elements shall not be present in any slice of the picture associated with the PH containing the syntax elements.

A fifth aspect relates to a method implemented by a video decoder and comprising: receiving, by the video decoder, a video bitstream comprising an ALF flag, wherein the ALF flag equal to a first value specifies that ALF signaling is present in a PH, and wherein the ALF flag equal to a second value specifies that ALF signaling is not present in the PH and may be present in slice headers; and decoding, by the video decoder using the ALF flag, a coded picture to obtain a decoded picture.

Optionally, in any of the preceding aspects, another implementation of the aspect provides that the method further comprises displaying the decoded picture on a display of an electronic device.

Optionally, in any of the preceding aspects, another implementation of the aspect provides that when non-picture level syntax elements are present in the PH, corresponding syntax elements shall not be present in any slice of the picture associated with the PH containing the syntax elements.

A sixth aspect relates to a method implemented by a video encoder and comprising: generating an ALF flag, wherein the ALF flag equal to a first value specifies that ALF signaling is present in a PH, and wherein the ALF flag equal to a second value specifies that ALF signaling is not present in the PH and may be present in slice headers; encoding, by the video encoder, the ALF flag into a video bitstream; and storing, by the video encoder, the video bitstream for communication toward a video decoder.

Optionally, in any of the preceding aspects, another implementation of the aspect provides that when non-picture level syntax elements are present in the PH, corresponding syntax elements shall not be present in any slice of the picture associated with the PH containing the syntax elements.

A seventh aspect relates to a method implemented by a video decoder and comprising: receiving, by the video decoder, a video bitstream comprising a syntax element, wherein the syntax element specifies that information may be present or is not present in a PH or specifies that the information may be present or is not present in slice headers; and decoding, by the video decoder using the syntax element, a coded picture to obtain a decoded picture.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
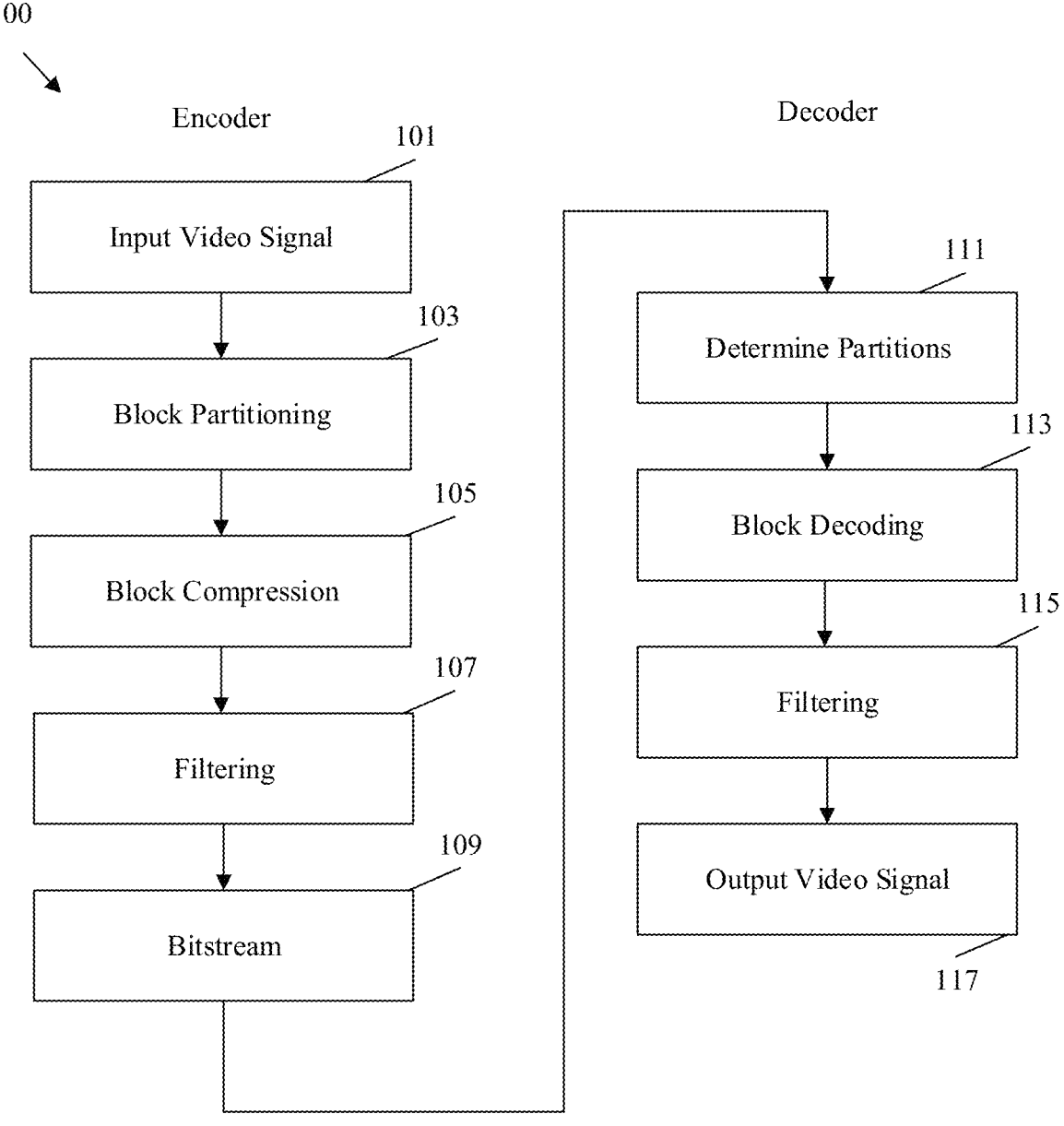
FIG. 1 is a flowchart of an example method of coding a video signal.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. The Following Abbreviations Apply:

ALF: adaptive loop filter
APS: adaptation parameter set
ASIC: application-specific integrated circuit
AU: access unit
AUD: access unit delimiter
BT: binary tree
CABAC: context-adaptive binary arithmetic coding
CAVLC: context-adaptive variable-length coding
Cb: blue difference chroma
CLVS: coded layer-wise video sequence
CLVS: coded layer video sequence
CPU: central processing unit
Cr: red difference chroma
CRA: clean random access
CTB: coding tree block
CTU: coding tree unit
CU: coding unit
CVS: coded video sequence
DC: direct current
DCI: decoding capability information
DCT: discrete cosine transform
DMM: depth modeling mode
DPB: decoded picture buffer
DPS: decoding parameter set
DSP: digital signal processor
DST: discrete sine transform
EO: electrical-to-optical
FPGA: field-programmable gate array
GDR: gradual decoding refresh
HEVC: High Efficiency Video Coding
ID: identifier
IDR: instantaneous decoding refresh
IEC: International Electrotechnical Commission
I/O: input/output
IRAP: intra random access pictures
ISO: International Organization for Standardization
ITU: International Telecommunication Union
ITU-T: ITU Telecommunication Standardization Sector
LMCS: luma mapping with chroma scaling
LTRP: long-term reference picture
MVP: motion vector predictor
NAL: network abstraction layer
OE: optical-to-electrical
PH: picture header PIPE: probability interval partitioning entropy
POC: picture order count
PPS: picture parameter set
PU: picture unit
QT: quad tree
RADL: random access decodable leading
RAM: random-access memory
RASL: random access skipped leading
RBSP: raw byte sequence payload
RDO: rate-distortion optimization
ROM: read-only memory
RPL: reference picture list
Rx: receiver unit
SAD: sum of absolute differences
SAO: sample adaptive offset
SBAC: syntax-based arithmetic coding
SOP: sequence of pictures
SPS: sequence parameter set
SRAM: static RAM
SSD: sum of squared differences
TCAM: ternary content-addressable memory
TT: triple tree
TU: transform unit
Tx: transmitter unit
VCL: video coding layer
VPS: video parameter set
VVC: Versatile Video Coding.

The following definitions apply unless modified elsewhere: A bitstream is a sequence of bits including video data that is compressed for transmission between an encoder and a decoder. An encoder is a device that employs encoding processes to compress video data into a bitstream. A decoder is a device that employs decoding processes to reconstruct video data from a bitstream for display. A picture is an array of luma samples or chroma samples that creates a frame or a field. A picture that is being encoded or decoded can be referred to as a current picture. A reference picture contains reference samples that can be used when coding other pictures by reference according to inter-prediction or inter-layer prediction. A reference picture list is a list of reference pictures used for inter-prediction or inter-layer prediction. A flag is a variable or single-bit syntax element that can take one of the two possible values: 0 or 1. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture, where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A PPS contains data related to an entire picture. More specifically, the PPS is a syntax structure containing syntax elements that apply to zero or more entire coded pictures as determined by a syntax element found in each picture header. An SPS contains data related to a sequence of pictures. An AU is a set of one or more coded pictures associated with the same display time (e.g., the same picture order count) for output from a DPB (e.g., for display to a user). An AUD indicates the start of an AU or the boundary between AUs. A decoded video sequence is a sequence of pictures that have been reconstructed by a decoder in preparation for display to a user.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in HEVC, the frame can first be divided into CTUs, which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., 33 in HEVC), a planar mode, and a DC mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and SAO filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
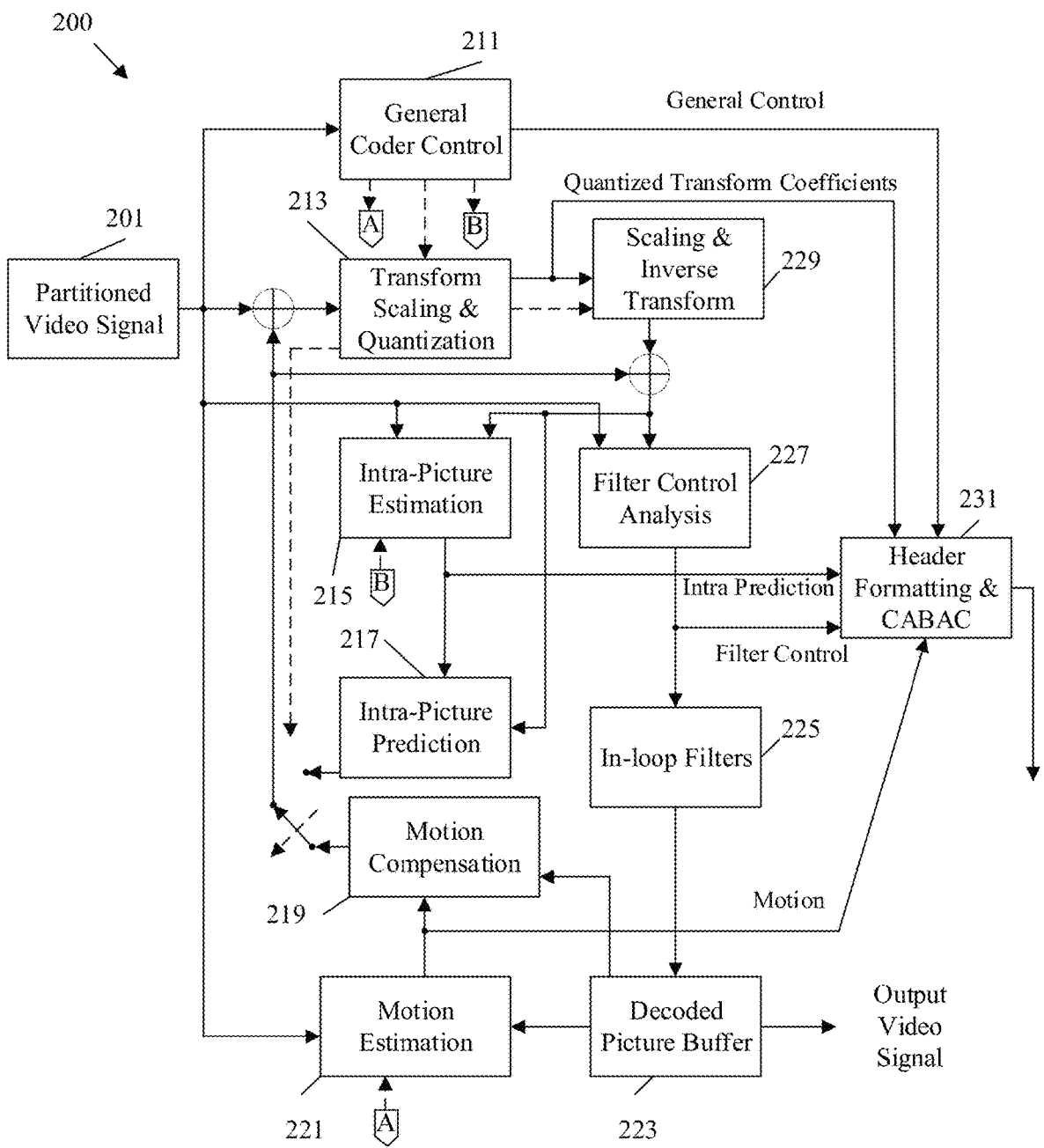
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and CABAC component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in CUs in some cases. For example, a CU can be a sub-portion of a CTU that contains a luma block, Cr block(s), and a Cb block(s) along with corresponding syntax instructions for the CU. The split modes may include a BT, TT, and QT employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by an SAD, an SSD, or other difference metrics. HEVC employs several coded objects including a CTU, CTBs, and CUs. For example, a CTU can be divided into CTBs, which can then be divided into CBs for inclusion in CUs. A CU can be encoded as a prediction unit containing prediction data and/or a TU containing transformed residual data for the CU. The motion estimation component 221 generates motion vectors, prediction units, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a prediction unit of a video block in an inter-coded slice by comparing the position of the prediction unit to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the prediction unit of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a DMM based on RDO.

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a DCT, a DST, or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a de-blocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing CAVLC, CABAC, SBAC, PIPE coding, or another entropy coding technique. Following the entropy coding, the coded bitstream may be transmitted to another device (e.g., a video decoder) or archived for later transmission or retrieval.

Figure 3:
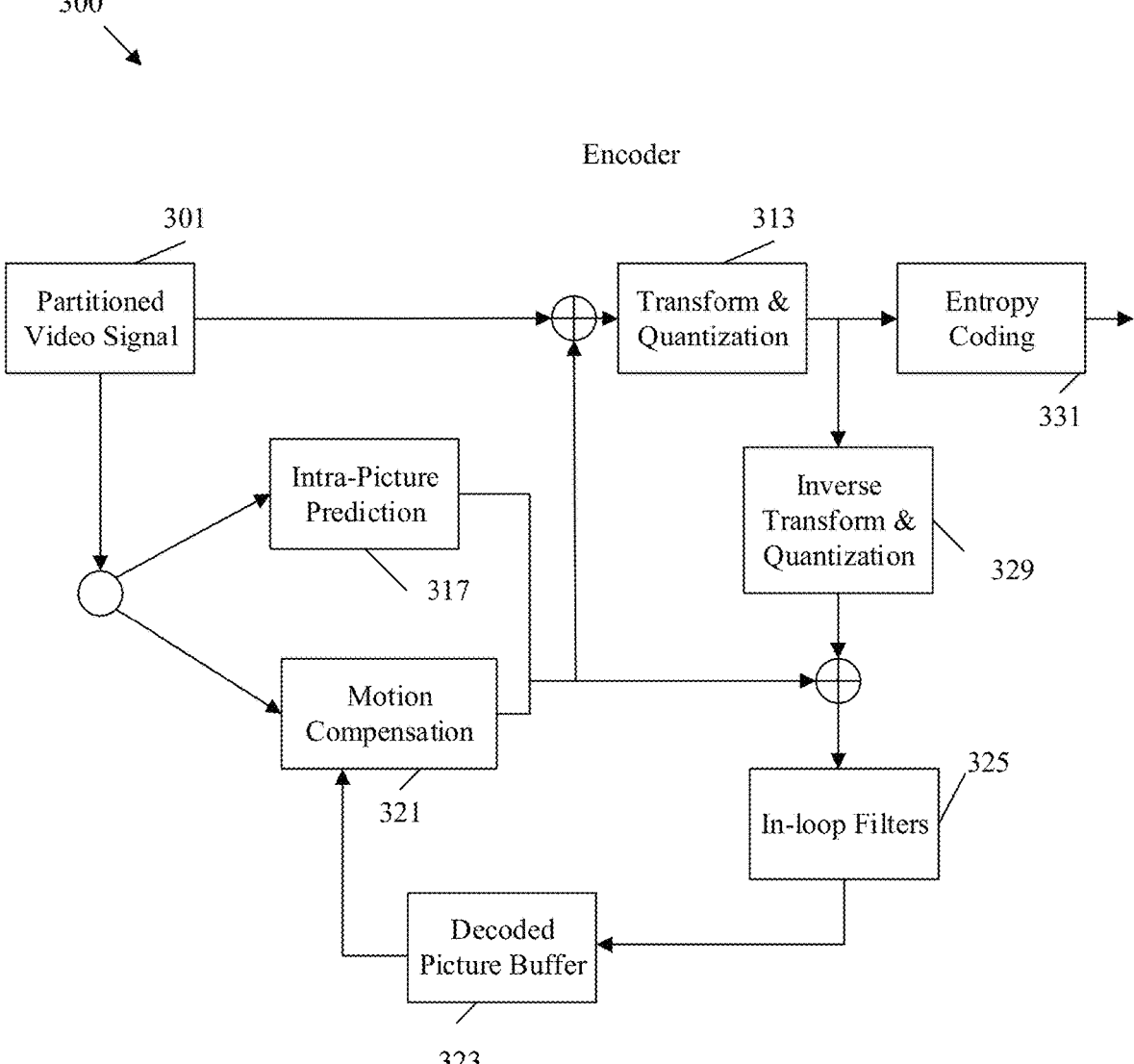
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
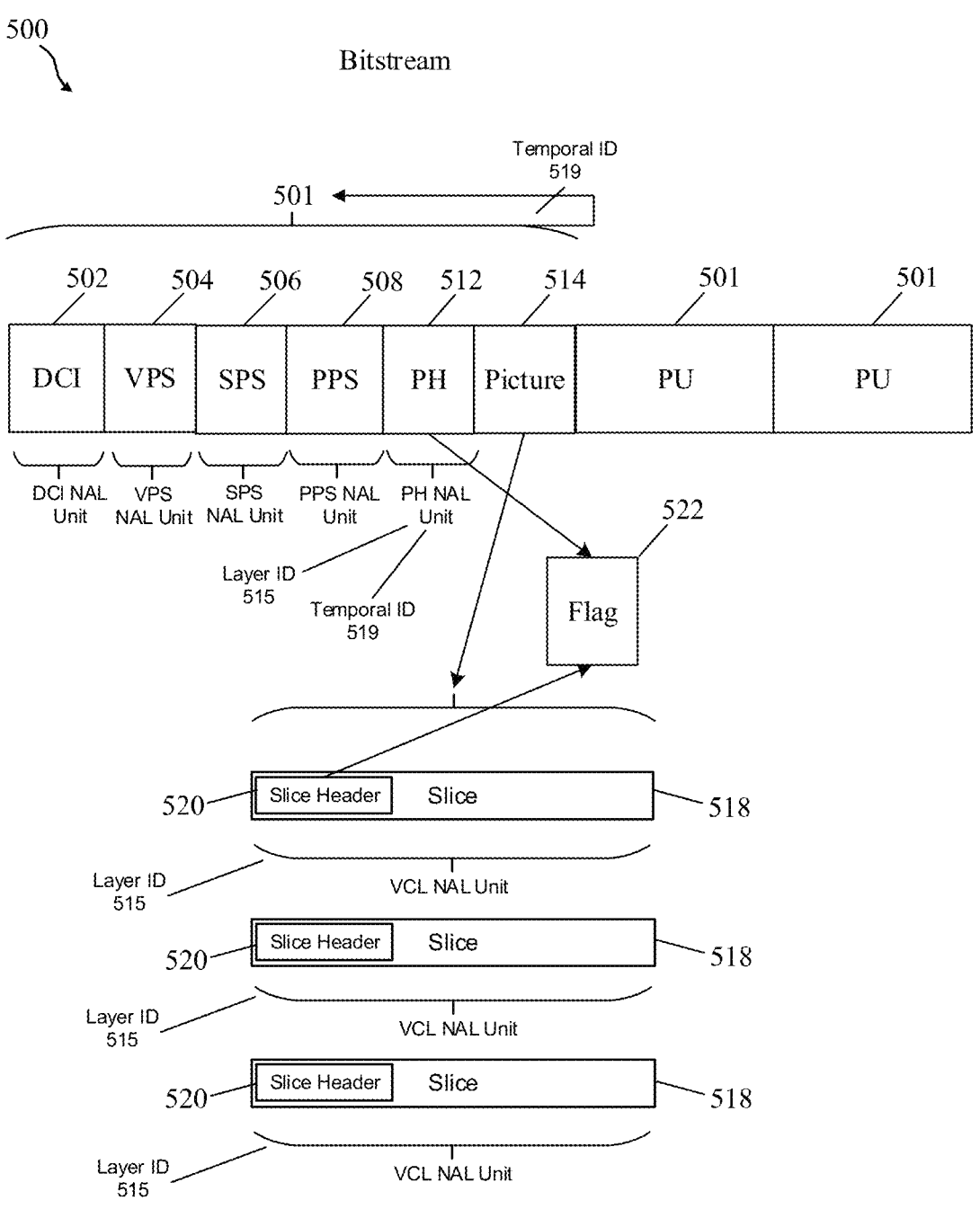
FIG. 5 illustrates an embodiment of a video bitstream.

FIG. 5 illustrates an embodiment of a video bitstream 500. The video bitstream 500 may also be referred to as a coded video bitstream, a bitstream, or variations thereof. The bitstream 500 comprises at least one PU 501. While three of PUs 501 are shown in FIG. 5, a different number of PUs 501 may be present in the bitstream 500 in practical applications. Each PU 501 is a set of NAL units that are associated with each other according to a specified classification rule, are consecutive in decoding order, and contain exactly one coded picture (e.g., picture 514). In an embodiment, each PU 501 has or is associated with a temporal ID 519.

In an embodiment, each PU 501 contains one or more of the following: a DCI 502, a VPS 504, an SPS 506, a PPS 508, a PH 512, and a picture 514. Each of the DCI 502, the VPS 504, the SPS 506, and the PPS 508 may be generically referred to as a parameter set. Other parameter sets not shown in FIG. 5 may also be included in the bitstream 500 such as, for example, an APS, which is a syntax structure containing syntax elements that apply to zero or more slices as determined by zero or more syntax elements found in slice headers 520.

The DCI 502, which may also be referred to a DPS, is a syntax structure containing syntax elements that apply to the entire bitstream. The DCI 502 includes parameters that stay constant for the lifetime of the video bitstream (e.g., bitstream 500), which can translate to the lifetime of a session. The DCI 502 can include profile, level, and sub-profile information to determine a maximum complexity interop point that is guaranteed to never be exceeded, even if splicing of video sequences occurs within a session. It further optionally includes constraint flags, which indicate that the video bitstream will be constrained to the use of certain features as indicated by the values of those flags. With this, a bitstream can be labelled as not using certain tools, which allows among other things for resource allocation in a decoder implementation. Like all parameter sets, the DCI 502 is present when first referenced, and referenced by the very first picture in a video sequence, implying that it has to be sent among the first NAL units in the bitstream. While multiple DCIs 502 can be in the bitstream, the value of the syntax elements therein cannot be inconsistent when being referenced.

The VPS 504 includes decoding dependency or information for reference picture set construction of enhancement layers. The VPS 504 provides an overall perspective or view of a scalable sequence, including what types of operation points are provided, the profile, tier, and level of the operation points, and some other high-level properties of the bitstream that can be used as the basis for session negotiation and content selection, etc.

The SPS 506 contains data that is common to all the pictures in an SOP. The SPS 506 is a syntax structure containing syntax elements that apply to zero or more entire CLVSs as determined by the content of a syntax element found in the PPS referred to by a syntax element found in each picture header. In contrast, the PPS 508 contains data that is common to the entire picture. The PPS 508 is a syntax structure containing syntax elements that apply to zero or more entire coded pictures as determined by a syntax element found in each picture header (e.g., PH 512).

The DCI 502, the VPS 504, the SPS 506, and the PPS 508 are contained in different types of NAL units. A NAL unit is a syntax structure containing an indication of the type of data to follow (e.g., coded video data). NAL units are classified into VCL and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

The PH 512 is a syntax structure containing syntax elements that apply to all slices (e.g., slices 518) of a coded picture (e.g., picture 514). In an embodiment, the PH 512 is in a new type of non-VCL NAL unit designated as a PH NAL unit. Therefore, the PH NAL unit has a PH NUT (e.g., PH_NUT). In an embodiment, there is one and only one PH 512 included in each PU 501. That is, the PU 501 contains a single or lone PH 512. In an embodiment, exactly one PH NAL unit is present for each picture 501 in the bitstream 500.

The picture 514 is an array of luma samples in monochrome format or an array of luma samples and two corresponding arrays of chroma samples in 4:2:0, 4:2:2, and 4:4:4 color format. In an embodiment, there is one and only one picture 514 included in each PU 501. As such, there is only one PH 512 and only one picture 514 corresponding to that PH 512 in each PU 501. That is, the PU 501 contains a single or lone picture 514.

Each picture 514 contains one or more slices 518. A slice 518 is an integer number of complete tiles or an integer number of consecutive complete CTU rows within a tile of a picture (e.g., picture 514). Each slice 518 is exclusively contained in a single NAL unit (e.g., a VCL NAL unit). In an embodiment, the single NAL unit is associated with or has a layer ID 515. A tile (not shown) is a rectangular region of CTUs within a particular tile column and a particular tile row in a picture (e.g., picture 514). A tile is a partitioned portion of a picture created by horizontal and vertical boundaries. Tiles may be rectangular and/or square. Specifically, a tile includes four sides that are connected at right angles. The four sides include two pair of parallel sides. Further, the sides in a parallel side pair are of equal length. As such, a tile may be any rectangular shape, where a square is a special case of a rectangle where all four sides are of equal length. An image/picture can contain one or more tiles. A CTU (not shown) is a CTB of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

The pictures 514 and their slices 518 comprise data associated with the images or video being encoded or decoded. Thus, the pictures 514 and their slices 518 may be simply referred to as the payload or data being carried in the bitstream 500. The PH 512 and the slice headers 520 may comprise a flag 522. The flag 522 may be an RPL flag, an SAO flag, or an ALF flag as described below.

While the VVC specification specifies only a handful of syntax elements that are picture level, in common-use cases there are more syntax elements whose values may be different among slices of the same picture, but usually are the same for all slices of the same picture. Examples of such syntax elements are syntax elements related to RPLs, joint chroma sign flags, SAO enable flags, ALF enable flags and parameters, LMCS enable flags and parameters, and scaling list enable flags and parameters. Non-picture-level syntax elements such as those are not signaled in the PH so that, even when they have the same values for all slices of the same picture, they still have to be repeated in every slice header of those slices. In other words, in some approaches, those syntax elements were signaled in a slice header. This was because the data they carry can vary from slice to slice. However, in most cases, they are the same for an entire picture containing the slices. The result is that these elements are signaled several times per picture, but the values are generally the same, which is redundant and wastes bits in the encoded bitstream.

Disclosed herein are embodiments for signaling of non-picture-level syntax at the picture level. In the embodiments, syntax elements are included in a picture header when the syntax elements are the same or included in a slice header when the syntax elements vary. However, in some embodiments, the syntax elements may not be included in both. First, non-picture-level syntax elements may be present in the PH. Non-picture-level syntax elements are syntax elements that are at a level of a video bitstream other than the picture level. Second, for each category of non-picture-level syntax elements, a flag specifies when syntax elements of the category are present in the PH or slice headers. The flag may be in the PH. The non-picture-level syntax elements include those related to signaling of RPLs, joint Cb Cr sign flags, SAO tool enabling and parameters, ALF tool enabling and parameters, LMCS tool enabling and parameters, and scaling list tool enabling and parameters. Third, when non-picture-level syntax elements are present in the PH, the corresponding syntax elements shall not be present in any slice of the picture associated with the picture header containing the syntax elements. The values of non-picture-level syntax elements that are present in the PH are applied to all slices of the picture associated with the picture header containing the syntax elements. Fourth, when non-picture-level syntax elements are not present in the PH, the corresponding syntax elements may be present in slice headers of slices of the picture associated with the picture header. By moving signaling of non-picture-level syntax elements to the picture level, redundancy is reduced and there are fewer wasted bits in the encoded bitstream.

PH RBSP Syntax

| | Descriptor |
| --- | --- |
| picture_header_rbsp( ) { | |
|   pic_type | u(3) |
|   pic_parameter_set_id | ue(v) |
|   non_reference_picture_flag | u(1) |
|   if( separate_colour_plane_flag = = 1 ) | |
|     colour_plane_id | u(2) |
|   pic_order_cnt_lsb | u(v) |
|   if( pic_type = = 2 ) | |
|     recovery_poc_cnt | ue(v) |
|   if(pic_type = = 0 \| \| pic_type = = 1 \| \| pic_type = = 2 ) | |
|     no_output_of_prior_pics_flag | u(1) |
|   if( output_flag_present_flag ) | |
|     pic_output_flag | u(1) |
|   if( pic_type != 0 \| \| sps_idr_rpl_present_flag ) | |
|     pic_rpl_present_flag | u(1) |
|   if( pic_rpl_present_flag ) { | |
|     for( i = 0; i < 2; i++ ) { | |
|       if( num_ref_pic_lists_in_sps[ i ] > 0 && | |
| !pps_ref_pic_list_sps_idc[ i ] && | |
|         ( i = = 0 \| \| ( i = = 1 && | |
| rpl1_idx_present_flag ) ) ) | |
|           pic_rpl_sps_flag[ i ] | u(1) |
|         if( pic_rpl_sps_flag[ i ] ) { | |
|           if( num_ref_pic_lists_in_sps[ i ] > 1 && | |
|             ( i = = 0 \| \| ( i = = 1 | |
| && rpl1_idx_present_flag ) ) ) | |
|               pic_rpl_idx[ i ] | u(v) |
|         } else | |
|           ref_pic_list_struct( i, | |
| num_ref_pic_lists_in_sps[ i ] ) | |
|         for( j = 0; j < NumLtrpEntries[ i ][ RplsIdx[ i ] ]; j++ ) | |
| { | |
|           if( ltrp_in_slice_header_flag[ i ][ RplsIdx[ i ] ] ) | |

-continued

| | Descriptor |
|---|---|
| pic_poc_lsb_lt[ i ][ j ] | u(v) |
| pic_delta_poc_msb_present_flag[ i ][ j ] | u(1) |
| if( pic_delta_poc_msb_present_flag[ i ][ j ] ) | |
| pic_delta_poc_msb_cycle_lt[ i ][ j ] | ue(v) |
| } | |
| } | |
| } | |
| if( pic_type != 0 && pic_type != 1 && pic_type != 3 ) | |
| if( sps_temporal_mvp_enabled_flag && | |
| !pps_temporal_mvp_enabled_idc ) | |
| pic_temporal_mvp_enabled_flag | u(1) |
| if( sps_joint_cbcr_enabled_flag ) | |
| pic_level_joint_cbcr_sign_flag | u(1) |
| if( sps_sao_enabled_flag ) { | |
| pic_level_sao_luma_enabled_flag | u(1) |
| if(ChromaArrayType != 0 ) | |
| pic_level_sao_chroma_enabled_flag | u(1) |
| } | |
| if( sps_alf_enabled_flag ) { | |
| pic_level_alf_enabled_flag | u(1) |
| if( pic_level_alf_enabled_flag ) { | |
| pic_num_alf_aps_ids_luma | u(3) |
| for( i = 0; i < pic_num_alf_aps_ids_luma; i++ ) | |
| pic_alf_aps_id_luma[ i ] | u(3) |
| if( ChromaArrayType != 0 ) | |

-continued

| | Descriptor |
|---|---|
| pic_alf_chroma_idc | u(2) |
| if( pic_alf_chroma_idc ) | |
| pic_alf_aps_id_chroma | u(3) |
| } | |
| } | |
| if( sps_lmcs_enabled_flag ) { | |
| pic_level_lmcs_enabled_flag | u(1) |
| if( pic_lmcs_enabled_flag ) { | |
| pic_lmcs_aps_id | u(2) |
| if( ChromaArrayType != 0 ) | |
| pic_chroma_residual_scale_flag | u(1) |
| } | |
| } | |
| if( sps_scaling_list_enabled_flag ) { | |
| pic_level_scaling_list_present_flag | u(1) |
| if( pic_level_scaling_list_present_flag ) | |
| pic_scaling_list_aps_id | u(3) |
| } | |
| rbsp_trailing_bits( ) | |
| } | |

Slice Header RBSP Syntax

| | Descriptor |
|---|---|
| slice_header( ) { | |
| if( rect_slice_flag \|\| NumBricksInPic > 1 ) | |
| slice_address | u(v) |
| if( !rect_slice_flag && !single_brick_per_slice_flag ) | |
| num_bricks_in_slice_minus1 | ue(v) |
| if( pic_type != 0 && pic_type != 1 && pic_type != 3 ) | |
| slice_type | ue(v) |
| if( ( ( pic_type != 0 \|\| sps_idr_rpl_present_flag ) && | |
| !pic_rpl_present_flag ) { | |
| for( i = 0; i < 2; i++ ) { | |
| if( num_ref_pic_lists_in_sps[ i ] > 0 && | |
| !pps_ref_pic_list_sps_idc[ i ] && | |
| ( i == 0 | |
| \|\| ( i == 1 && rpl1_idx_present_flag ) ) ) | |
| slice_rpl_sps_flag[ i ] | u(1) |
| if( slice_rpl_sps_flag[ i ] ) { | |
| if( num_ref_pic_lists_in_sps[ i ] > 1 && | |
| ( i == 0 \|\| ( i | |
| == 1 && rpl1_idx_present_flag ) ) ) | |
| slice_rpl_idx[ i ] | u(v) |
| } else | |
| ref_pic_list_struct( i, | |
| num_ref_pic_lists_in_sps[ i ] ) | |
| for( j = 0; j < NumLtrpEntries[ i ][ RplsIdx[ i ] ]; j++ ) | |
| { | |
| if( ltrp_in_slice_header_flag[ i ][ RplsIdx[ i ] ] ) | |
| slice_poc_lsb_lt[ i ][ j ] | u(v) |
| slice_delta_poc_msb_present_flag[ i ][ j ] | u(1) |
| if( slice_delta_poc_msb_present_flag[ i ][ j ] ) | |
| slice_delta_poc_msb_cycle_lt[ i ][ j ] | ue(v) |
| } | |
| } | |
| } | |
| if( ( slice_type != I && num_ref_entries[ 0 ][ RplsIdx[ 0 ] ] > 1 ) \|\| | |
| ( slice_type == B && num_ref_entries[ 1 ][ RplsIdx[ 1 ] ] > | |
| 1 ) ) { | |
| num_ref_idx_active_override_flag | u(1) |
| if( num_ref_idx_active_override_flag ) | |
| for( i = 0; i < ( slice_type == B ? 2 : 1 ); i++ ) | |
| if( num_ref_entries[ i ][ RplsIdx[ i ] ] > 1 ) | |
| num_ref_idx_active_minus1[ i ] | ue(v) |
| } | |
| if( partition_constraints_override_enabled_flag ) { | |
| partition_constraints_override_flag | ue(v) |
| if( partition_constraints_override_flag ) { | |
| slice_log2_diff_min_qt_min_cb_luma | ue(v) |
| slice_max_mtt_hierarchy_depth_luma | ue(v) |

| | Descriptor |
|---|---|
| if( slice_max_mtt_hierarchy_depth_luma != 0 ) | |
| slice_log2_diff_max_bt_min_qt_luma | ue(v) |
| slice_log2_diff_max_tt_min_qt_luma | ue(v) |
| } | |
| if( slice_type == I && qtbtt_dual_tree_intra_flag ) { | |
| slice_log2_diff_min_qt_min_cb_chroma | ue(v) |
| slice_max_mtt_hierarchy_depth_chroma | ue(v) |
| if( slice_max_mtt_hierarchy_depth_chroma != | |
| 0 ) | |
| slice_log2_diff_max_bt_min_qt_chroma | ue(v) |
| slice_log2_diff_max_tt_min_qt_chroma | ue(v) |
| } | |
| } | |
| } | |
| } | |
| if( slice_type != I ) { | |
| if( slice_type == B && !pps_mvd_l1_zero_idc ) | |
| mvd_l1_zero_flag | u(1) |
| if( cabac_init_present_flag ) | |
| cabac_init_flag | u(1) |
| if( pic_temporal_mvp_enabled_flag ) { | |
| if( slice_type == B && !pps_collocated_from_l0_idc | |
| ) | |
| collocated_from_l0_flag | u(1) |
| if( ( collocated_from_l0_flag && | |
| NumRefIdxActive[ 0 ] > 1 ) | | | |
| ( !collocated_from_l0_flag && | |
| NumRefIdxActive[ 1 ] > 1 ) ) | |
| collocated_ref_idx | ue(v) |
| } | |
| if( ( pps_weighted_pred_flag && slice_type == P ) | | | |
| ( pps_weighted_bipred_flag && slice_type == B ) ) | |
| pred_weight_table( ) | |
| if( !pps_six_minus_max_num_merge_cand_plus1 ) | |
| six_minus_max_num_merge_cand | ue(v) |
| if( sps_affine_enabled_flag && | |
| !pps_five_minus_max_num_subblock_merge_cand_plus1 ) | |
| five_minus_max_num_subblock_merge_cand | ue(v) |
| if( sps_fpel_mmvd_enabled_flag ) | |
| slice_fpel_mmvd_enabled_flag | u(1) |
| if( sps_bdof_dmvr_slice_present_flag ) | |
| slice_disable_bdof_dmvr_flag | u(1) |
| if( sps_triangle_enabled_flag && MaxNumMergeCand >= 2 | |
| && | |
| !pps_max_num_merge_cand_minus_max_num_triangle_cand_minus | |
| 1 ) | |
| max_num_merge_cand_minus_max_num_triangle_cand | ue(v) |
| } | |
| if ( sps_ibc_enabled_flag ) | |
| slice_six_minus_max_num_ibc_merge_cand | ue(v) |
| if( sps_joint_cbcr_enabled_flag && !pic_level_joint_cbcr_sign_flag | |
| ) | |
| slice_joint_cbcr_sign_flag | u(1) |
| slice_qp_delta | se(v) |
| if( pps_slice_chroma_qp_offsets_present_flag ) { | |
| slice_cb_qp_offset | se(v) |
| slice_cr_qp_offset | se(v) |
| if( sps_joint_cbcr_enabled_flag ) | |
| slice_joint_cbcr_qp_offset | se(v) |
| } | |
| if( sps_sao_enabled_flag ) { | |
| if( !pic_level_sao_luma_enabled_flag ) | |
| slice_sao_luma_flag | u(1) |
| if( ChromaArrayType != 0 && | |
| !pic_level_sao_chroma_enabled_flag ) | |
| slice_sao_chroma_flag | u(1) |
| } | |
| if( sps_alf_enabled_flag && !pic_level_alf_enabled_flag ) { | |
| slice_alf_enabled_flag | u(1) |
| if( slice_alf_enabled_flag ) { | |
| slice_num_alf_aps_ids_luma | u(3) |
| for( i = 0; i < slice_num_alf_aps_ids_luma; i++ ) | |
| slice_alf_aps_id_luma[ i ] | u(3) |
| if( ChromaArrayType != 0 ) | |
| slice_alf_chroma_idc | u(2) |
| if( slice_alf_chroma_idc ) | |
| slice_alf_aps_id_chroma | u(3) |

-continued

|  | Descriptor |
|---|---|
|     } | |
|   } | |
|   if( !pps_dep_quant_enabled_flag ) | |
|     dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|     slice_beta_offset_div2 | se(v) |
|     slice_tc_offset_div2 | se(v) |
|     } | |
|   } | |
|   if( sps_lmcs_enabled_flag && !pic_level_lmcs_enabled_flag ) { | |
|     slice_lmcs_enabled_flag | u(1) |
|     if( slice_lmcs_enabled_flag ) { | |
|       slice_lmcs_aps_id | u(2) |
|       if( ChromaArrayType != 0 ) | |
|         slice_chroma_residual_scale_flag | u(1) |
|     } | |
|   } | |
|   if( sps_scaling_list_enabled_flag && | |
| !pic_level_scaling_list_present_flag ) { | |
|     slice_scaling_list_present_flag | u(1) |
|     if( slice_scaling_list_present_flag ) | |
|       slice_scaling_list_aps_id | u(3) |
|   } | |
|   if( entry_point_offsets_present_flag && NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

PH RBSP Semantics

The PH contains information that is common for all slices of the coded picture for which the next VCL NAL unit in decoding order is the first coded slice.

pic_type indicates the characterization of the coded pictures as listed in Table 1 for the given value of pic_type. The value of pic_type shall be equal to 0 to 5, inclusive, in bitstreams conforming to this version of this specification. Other values of pic_type are reserved for future use by ITU-T ISO/IEC. Decoders conforming to this version of this specification shall ignore reserved values of pic_type.

TABLE 1

| | |
|---|---|
| Interpretation of pic_type | |
| pic_type | characterization of the coded picture |
| 0 | The coded picture is an IDR picture. |
| 1 | The coded picture is a CRA picture. |
| 2 | The coded picture is a GDR picture. |
| 3 | The coded picture is a non-IRAP, non-GDR picture and contains I slices only. |
| 4 | The coded picture is a non-IRAP, non-GDR picture and contains P and I slices only. |
| 5 | The coded picture is a non-IRAP, non-GDR picture and contains B, P, and I slices. | pic_parameter_set_id specifies the value of pps_pic_parameter_set_id for the PPS in use. The value of pic_parameter_set_id shall be in the range of 0 to 63, inclusive.

non_reference_picture_flag equal to 1 specifies the picture associated with the PH is never used as a reference picture. non_reference_picture_flag equal to 0 specifies the picture may or may not be used as a reference picture.

colour_plane_id specifies the colour plane associated with the picture associated with the PH when separate_colour_plane_flag is equal to 1. The value of colour_plane_id shall be in the range of 0 to 2, inclusive. colour_plane_id values 0, 1, and 2 correspond to the Y, Cb, and Cr planes, respectively. There is no dependency between the decoding processes of pictures having different values of colour_plane_id.

pic_order_cnt_lsb specifies the picture order count modulo MaxPicOrderCntLsb for the picture associated with the PH. The length of the pic_order_cnt_lsb syntax element is log 2_max_pic_order_cnt_lsb_minus4+4 bits. The value of the pic_order_cnt_lsb shall be in the range of 0 to MaxPicOrderCntLsb−1, inclusive.

recovery_poc_cnt specifies the recovery point of decoded pictures in output order. If there is a picture picA that follows the current GDR picture in decoding order in the CVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

The variable RpPicOrderCntVal is derived as follows: RpPicOrderCntVal=PicOrderCntVal+recovery_poc_cnt.

no_output_of_prior_pics_flag affects the output of previously-decoded pictures in the decoded picture buffer after the decoding of a CLVSS picture that is not the first picture in the bitstream as specified in Annex C.

pic_output_flag affects the decoded picture output and removal processes as specified in Annex C. When pic_output_flag is not present, it is inferred to be equal to 1.

pic_rpl_present_flag equals 1 specifies that RPL signaling is present in the PH. pic_rpl_present_flag equals 0 specifies that RPL signaling is not present in the PH and may be present in slice headers of slices of the picture. When not present, the value of pic_rpl_present_flag is inferred to be equal to 0. RPL signaling is RPL information comprised in the video bitstream 500.

pic_rpl_sps_flag[i] equal to 1 specifies that RPL i of the picture is derived based on one of the ref_pic_list_struct(listIdx, rplsIdx) syntax structures with listIdx equal to i in the SPS. ref_pic_list_sps_flag[i] equal to 0 specifies that reference picture list i of the picture is derived based on the ref_pic_list_struct(listIdx, rplsIdx) syntax structure with listIdx equal to i that is directly included in the picture header.

When pic_rpl_sps_flag[i] is not present, the following applies: If num_ref_pic_lists_in_sps[i] is equal to 0, the value of pic_rpl_sps_flag[i] is inferred to be equal to 0. Otherwise (num_ref_pic_lists_in_sps[i] is greater than 0), if rpl1_idx_present_flag is equal to 0, the value of pic_rpl_ equal to 0. When pic_rpl_sps_flag[i] is equal to 1 and rpl1_idx_present_flag is equal to 0, the value of pic_rpl_idx[1] is inferred to be equal to pic_rpl_idx[0].

The variable PicRplsIdx[i] is derived as follows: PicRplsIdx[i]=pic_rpl_sps_flag[i]? pic_rpl_idx[i]:num_ref_pic_lists_in_sps[i].

pic_poc_lsb_lt[i][j] specifies the value of the picture order count modulo MaxPicOrderCntLsb of the j-th LTRP entry in the i-th reference picture list for the picture associated with the PH. The length of the pic_poc_lsb_lt[i][j] syntax element is log 2_max_pic_order_cnt_lsb_minus4+4 bits.

The variable PicPocLsbLt[i][j] is derived as follows: PicPocLsbLt[i][j]=ltrp_in_slice_header_flag[i][PicRplsIdx[i]]? pic_poc_lsb_lt[i][j]:rpls_poc_lsb_lt[listIdx][PicRplsIdx[i]][j].

pic_delta_poc_msb_present_flag[i][j] equal to 1 specifies that pic_delta_poc_msb_cycle_lt[i][j] is present. pic_delta_poc_msb_present_flag[i][j] equal to 0 specifies that pic_delta_poc_msb_cycle_lt[i][j] is not present.

Let prevTid0Pic be the previous picture in decoding order that has nuh_layer_id the same as the PH, has TemporalId equal to 0, and is not a RASL or RADL picture. Let setOfPrevPocVals be a set consisting of the following: the PicOrderCntVal of prevTid0Pic; the PicOrderCntVal of each picture that is referred to by entries in RefPicList[0] or RefPicList[1] of prevTid0Pic and has nuh_layer_id the same as the current picture; and the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PicPocLsbLt[i][j], the value of pic_delta_poc_msb_present_flag[i][j] shall be equal to 1.

pic_delta_poc_msb_cycle_lt[i][j] specifies the value of the variable PicFullPocLt[i][j] as follows:

```
if( j = = 0 )
    deltaPocMsbCycleLt[ i ][ j ] = pic_delta_poc_msb_cycle_lt[ i ][ j ]
else                               (7 97)
    deltaPocMsbCycleLt[ i ][ j ] = pic_delta_poc_msb_cycle_lt[ i ][ j ] +
deltaPocMsbCycleLt[ i ][ j − 1 ]
PicFullPocLt[ i ][ j ] = PicOrderCntVal − deltaPocMsbCycleLt[ i ][ j ] *
MaxPicOrderCntLsb −
    ( PicOrderCntVal & ( MaxPicOrderCntLsb − 1 ) ) + PicPocLsbLt[ i ][ j ]
```

50

_sps_flag[1] is inferred to be equal to pic_rpl_sps_flag[0]. Otherwise, the value of pic_rpl_sps_flag[i] is inferred to be equal to pps_ref_pic_list_sps_idc[i]−1.

pic_rpl_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of RPL i of the current picture. The syntax element pic_rpl_idx[i] is represented by Ceil(Log 2(num_ref_pic_lists_in_sps[i])) bits. When not present, the value of pic_rpl_idx[i] is inferred to be equal to 0. The value of pic_rpl_idx[i] shall be in the range of 0 to num_ref_pic_lists_in_sps[i]−1, inclusive. When pic_rpl_sps_flag[i] is equal to 1 and num_ref_pic_lists_in_sps[i] is equal to 1, the value of pic_rpl_idx[i] is inferred to be The value of pic_delta_poc_msb_cycle_lt[i][j] shall be in the range of 0 to 2 (32−log 2_max_pic_order_cnt_lsb_minus4−4), inclusive. When not present, the value of pic_delta_poc_msb_cycle_lt[i][j] is inferred to be equal to 0.

pic_temporal_mvp_enabled_flag specifies whether temporal MVPs can be used for inter prediction. If pic_temporal_mvp_enabled_flag is equal to 0, the syntax elements of the picture associated with the picture header shall be constrained such that no temporal MVP is used in decoding of the picture. Otherwise (pic_temporal_mvp_enabled_flag is equal to 1), temporal MVPs may be used in decoding of the picture.

When pic_temporal_mvp_enabled_flag is not present, the following applies: If sps_temporal_mvp_enabled_flag is equal to 0, the value of pic_temporal_mvp_enabled_flag is inferred to be equal to 0. Otherwise (sps_temporal_mvp_enabled_flag is equal to 1), the value of pic_tempo-ral_mvp_enabled_flag is inferred to be equal to pps_tem-poral_mvp_enabled_idc−1.

pic_level_joint_cbcr_sign_flag equal to 1 specifies that slice_joint_cbcr_sign_flag is not present in slice header. pic_level_joint_cbcr_sign_flag equal to 0 specifies that slice_joint_cbcr_sign_flag may be present in slice header. When not present, the value of pic_level_joint_cbcr_sign_flag is inferred to be equal to 0.

pic_level_alf_enabled_flag equal to 1 specifies that ALF is enabled for all slices belonging to the picture associated with the PH and may be applied to Y, Cb, or Cr colour component in the slices. pic_level_alf_enabled_flag equal to 0 specifies that ALF may be disabled for one, or more, or all slices belonging to the picture associated with the PH. When not present, pic_level_alf_enabled_flag is inferred to be equal to 0.

pic_num_alf_aps_ids_luma specifies the number of ALF APSs that the slices belong to the picture associated with the PH refers to. The value of slice_num_alf_aps_ids_luma shall be in the range of 0 to 7, inclusive.

pic_alf_aps_id_luma[i] specifies the adaptation_parameter_set_id of the i-th ALF APS that the luma component of the slices of the picture associated with the PH refers to.

pic_alf_chroma_idc equal to 0 specifies that the ALF is not applied to Cb and Cr colour components. pic_alf_chroma_idc equal to 1 indicates that the ALF is applied to the Cb colour component. pic_alf_chroma_idc equal to 2 indicates that the ALF is applied to the Cr colour component. pic_alf_chroma_idc equal to 3 indicates that the ALF is applied to Cb and Cr colour components. When pic_alf_chroma_idc is not present, it is inferred to be equal to 0.

pic_alf_aps_id_chroma specifies the adaptation_parameter_set_id of the ALF APS that the chroma component of the slices of the picture associated with the picture header refers to.

pic_level_lmcs_enabled_flag equal to 1 specifies that luma mapping with chroma scaling is enabled for all slices belonging to the picture associated with the picture header. pic_level_lmcs_enabled_flag equal to 0 specifies that luma mapping with chroma scaling may be disabled for one, or more, or all slices belonging to the picture associated with the picture header. When not present, the value of pic_level_lmcs_enabled_flag is inferred to be equal to 0.

pic_lmcs_aps_id specifies the adaptation_parameter_set_id of the LMCS APS that the slices of the picture associated with the picture header refer to.

associated with the picture header. When pic_chroma_residual_scale_flag is not present, it is inferred to be equal to 0.

pic_level_scaling_list_present_flag equal to 1 specifies that the scaling list data used for slices of the picture associated with the picture header is derived based on the scaling list data contained in the referenced scaling list APS. pic_level_scaling_list_present_flag equal to 0 specifies that the scaling list data used for one, or more, or all slices of the picture associated with the picture header is the default scaling list data derived specified in clause 7.4.3.16. When not present, the value of pic_level_scaling_list_present_flag is inferred to be equal to 0.

pic_scaling_list_aps_id specifies the adaptation_parameter_set_id of the scaling list APS.

Slice Header RBSP Semantics slice_rpl_sps_flag[i] equal to 1 specifies that RPL i of the current slice is derived based on one of the ref_pic_list_struct(listIdx, rplsIdx) syntax structures with list-Idx equal to i in the SPS. slice_rpl_sps_flag[i] equal to 0 specifies that RPL i of the current slice is derived based on the ref_pic_list_struct(listIdx, rplsIdx) syntax structure with listIdx equal to i that is directly included in the slice headers of the current picture.

When slice_rpl_sps_flag[i] is not present, the following applies: If pic_rpl_present_flag is equal to 1, the value of slice_rpl_sps_flag[i] is inferred to be equal to pic_rpl_sps_flag[i]. Otherwise, if num_ref_pic_lists_in_sps[i] is equal to 0, the value of slice_rpl_sps_flag[i] is inferred to be equal to 0. Otherwise (num_ref_pic_lists_in_sps[i] is greater than 0), if rpl1_idx_present_flag is equal to 0, the value of slice_rpl_sps_flag[1] is inferred to be equal to slice_rpl_sps_flag[0]. Otherwise, the value of slice_rpl_sps_flag[i] is inferred to be equal to pps_ref_pic_list_sps_idc[i]−1.

slice_rpl_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of reference picture list i of the current slice. The syntax element slice_rpl_idx[i] is represented by Ceil(Log 2(num_ref_pic_lists_in_sps[i])) bits. The value of slice_rpl_idx[i] shall be in the range of 0 to num_ref_pic_lists_in_sps[i]−1, inclusive. When slice_rpl_sps_flag[i] is equal to 1 and num_ref_pic_lists_in_sps[i] is equal to 1, the value of slice_rpl_idx[i] is inferred to be equal to 0. When slice_rpl_sps_flag[i] is equal to 1 and rpl1_idx_present_flag is equal to 0, the value of slice_rpl_idx[1] is inferred to be equal to slice_rpl_idx[0]. The variable RplsIdx[i] is derived as follows:

```
if( pic_rpl_present_flag )
    RplsIdx[ i ] = PicRplsIdx[ i ]
else
    RplsIdx[ i ] = slice_rpl_sps_flag[ i ] ? slice_rpl_idx[ i ] : num_ref_pic_lists_in_sps[
    i ]
``` pic_chroma_residual_scale_flag equal to 1 specifies that chroma residual scaling is enabled for the all slices belonging to the picture associated with the picture header. pic_chroma_residual_scale_flag equal to 0 specifies that chroma residual scaling may be disabled for one, or more, or all slices belonging to the picture slice_poc_lsb_lt[i][j] specifies the value of the picture order count modulo MaxPicOrderCntLsb of the j-th LTRP entry in the i-th reference picture list for the current slice. The length of the slice_poc_lsb_lt[i][j] syntax element is log 2_max_pic_order_cnt_lsb_minus4+4 bits.

The variable PocLsbLt[i][j] is derived as follows:

```
if( pic_rpl_present_flag )
    PocLsbLt[ i ][ j ] = PocLsbLt[ i ][ j ]
else
    PocLsbLt[ i ][ j ] = ltrp_in_slice_header_flag[ i ][ RplsIdx[ i ] ] ? slice_poc_lsb_lt[
    i ][ j ] : rpls_poc_lsb_lt[ listIdx ][ RplsIdx[ i ] ][ j ]
``` slice_delta_poc_msb_present_flag[i][j] equal to 1 specifies that slice_delta_poc_msb_cycle_lt[i][j] is present. slice_delta_poc_msb_present_flag[i][j] equal to 0 specifies that slice_delta_poc_msb_cycle_lt[i][j] is not present.

Let prevTid0Pic be the previous picture in decoding order that has nuh_layer_id the same as the current picture, has TemporalId equal to 0, and is not a RASL or RADL picture. Let setOfPrevPocVals be a set consisting of the following: the PicOrderCntVal of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When pic_rpl_present_flag is equal to 0 and there is more than one value in setOfPrevPocVals for which the value modulo MaxPicOrderCntLsb is equal to PocLsbLt[i][j], the value of slice_delta_poc_msb_present_flag[i][j] shall be equal to 1.

slice_delta_poc_msb_cycle_lt[i][j] specifies the value of the variable FullPocLt[i][j] as follows:

```
if( pic_rpl_present_flag )
    FullPocLt[ i ][ j ] = PicFullPocLt[ i ][ j ]
else {
    if( j = = 0 )
        deltaPocMsbCycleLt[ i ][ j ] = slice_delta_poc_msb_cycle_lt[ i ][ j ]
    else
        deltaPocMsbCycleLt[ i ][ j ] = slice_delta_poc_msb_cycle_lt[ i ][ j ] +
        deltaPocMsbCycleLt[ i ][ j – 1 ]
    FullPocLt[ i ][ j ] = PicOrderCntVal – deltaPocMsbCycleLt[ i ][ j ] *
    MaxPicOrderCntLsb – ( PicOrderCntVal & ( MaxPicOrderCntLsb – 1 ) ) +
    PocLsbLt[ i ][ j ]
    }
```

The value of slice_delta_poc_msb_cycle_lt[i][j] shall be in the range of 0 to 2 (32–log 2_max_pic_order_cnt_lsb_minus4–4), inclusive. When not present, the value of slice_delta_poc_msb_cycle_lt[i][j] is inferred to be equal to 0.

slice_joint_cbcr_sign_flag specifies whether, in transform units with tu_joint_cbcr_residual_flag[x0][y0] equal to 1, the co-located residual samples of both chroma components have inverted signs. When tu_joint_cbcr_residual_flag[x0][y0] equal to 1 for a transform unit, slice_joint_cbcr_sign_flag equal to 0 specifies that the sign of each residual sample of the Cr (or Cb) component is identical to the sign of the co-located Cb (or Cr) residual sample and slice_joint_cbcr_sign_flag equal to 1 specifies that the sign of each residual sample of the Cr (or Cb) component is given by the inverted sign of the co-located Cb (or Cr) residual sample. When not present, the value of slice_joint_cbcr_sign_flag is inferred to be equal to pic_level_joint_cbcr_sign_flag.

slice_sao_luma_flag equal to 1 specifies that SAO is enabled for the luma component in the current slice. slice_sao_luma_flag equal to 0 specifies that SAO is disabled for the luma component in the current slice. When slice_sao_luma_flag is not present, it is inferred to be equal to pic_level_sao_luma_enabled_flag.

slice_sao_chroma_flag equal to 1 specifies that SAO is enabled for the chroma component in the current slice. slice_sao_chroma_flag equal to 0 specifies that SAO is disabled for the chroma component in the current slice. When slice_sao_chroma_flag is not present, it is inferred to be equal to pic_level_sao_chroma_enabled_flag.

slice_alf_enabled_flag equal to 1 specifies that ALF is enabled and may be applied to Y, Cb, or Cr colour component in a slice. slice_alf_enabled_flag equal to 0 specifies that ALF is disabled for all colour components in a slice. When not present, the value of slice_alf_enabled_flag is inferred to be equal to pic_level_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of pic_num_alf_aps_ids_luma. The value of slice_num_alf_aps_ids_luma shall be in the range of 0 to 7, inclusive.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of pic_alf_aps_id_luma[i].

For intra slices and slices in an IRAP picture, slice_alf_aps_id_luma[i] shall not refer to an ALF APS associated with other pictures rather than the picture containing the intra slices or the IRAP picture.

slice_alf_chroma_idc equal to 0 specifies that the ALF is not applied to Cb and Cr colour components. slice_alf_chroma_idc equal to 1 indicates that the ALF is applied to the Cb colour component. slice_alf_chroma_idc equal to 2 indicates that the ALF is applied to the Cr colour component. slice_alf_chroma_idc equal to 3 indicates that the ALF is applied to Cb and Cr colour components. When slice_alf_chroma_idc is not present, it is inferred to be equal to pic_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of pic_alf_aps_id_chroma.

For intra slices and slices in an IRAP picture, slice_alf_aps_id_chroma shall not refer to an ALF APS associated with other pictures rather than the picture containing the intra slices or the IRAP picture.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to pic_lmcs_enabled_flag.

slice_lmcs_aps_id specifies the adaptation_parameter_set_id of the LMCS APS that the slice refers to. The TemporalId of the APS NAL unit having aps_params_type equal to LMCS_APS and adaptation_parameter_set_id equal to slice_lmcs_aps_id shall be less than or equal to the TemporalId of the coded slice NAL unit. When slice_lmcs_enabled_flag is equal to 1 and slice_lmcs_aps_id is not present, the value of slice_lmcs_aps_id is inferred to be equal to the value of pic_lmcs_aps_id.

When present, the value of slice_lmcs_aps_id shall be the same for all slices of a picture.

slice_chroma_residual_scale_flag equal to 1 specifies that chroma residual scaling is enabled for the current slice. slice_chroma_residual_scale_flag equal to 0 specifies that chroma residual scaling is not enabled for the current slice. When slice_chroma_residual_scale_flag is not present, it is inferred to be equal to pic_chroma_residual_scale_flag.

slice_scaling_list_present_flag equal to 1 specifies that the scaling list data used for the current slice is derived based on the scaling list data contained in the referenced scaling list APS. slice_scaling_list_present_flag equal to 0 specifies that the scaling list data used for the current picture is the default scaling list data derived specified in clause 7.4.3.16. When not present, the value of slice_scaling_list_present_flag is inferred to be equal to pic_level_scaling_list_present_flag.

slice_scaling_list_aps_id specifies the adaptation_parameter_set_id of the scaling list APS. The TemporalId of the APS NAL unit having aps_params_type equal to SCALING_APS and adaptation_parameter_set_id equal to slice_scaling_list_aps_id shall be less than or equal to the TemporalId of the coded slice NAL unit. When slice_scaling_list_enabled_flag is equal to 1 and slice_scaling_list_aps_id is not present, the value of slice_scaling_list_aps_id is inferred to be equal to the value of pic_scaling_list_aps_id.

Figure 6:
FIG. 6 is a flowchart illustrating a method of decoding a bitstream according to a first embodiment.
Figure 6:
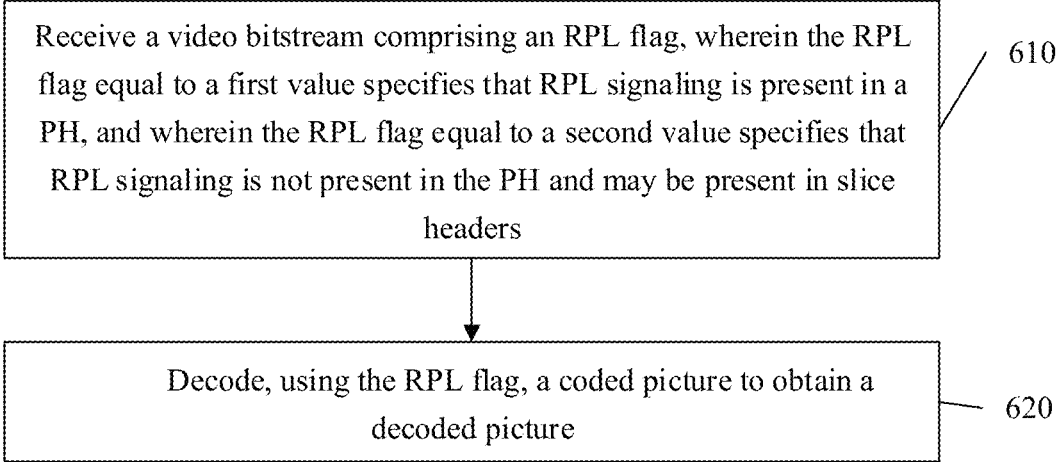

FIG. 6 is a flowchart illustrating a method 600 of decoding a bitstream according to a first embodiment. The decoder 400 may implement the method 600. At step 610, a video bitstream comprising an RPL flag is received. The RPL flag equal to a first value specifies that RPL signaling is present in a PH. The RPL flag equal to a second value specifies that RPL signaling is not present in the PH and may be present in slice headers. Finally, at step 620, a coded picture is decoded using the RPL flag to obtain a decoded picture.

The method 600 may implement additional embodiments. For instance, the first value is 1. The second value is 0. The bitstream further comprises an RPL SPS flag, wherein the RPL SPS flag specifies that RPL i is derived based on one of ref_pic_list_struct(listIdx, rplsIdx) syntax structures with listIdx equal to i in an SPS or specifies that RPL i is derived based on one of ref_pic_list_struct(listIdx, rplsIdx) syntax structures with listIdx equal to i that is directly included. The bitstream further comprises an RPL index, wherein the RPL index specifies an index, into a list of ref_pic_list_struct (listIdx, rplsIdx) syntax structures with listIdx equal to i included in an SPS, of a ref_pic_list_struct(listIdx, rplsIdx) syntax structure with listIdx equal to i that is used for derivation of RPL i of a current picture. The decoded picture is displayed on a display of an electronic device.

Figure 7:
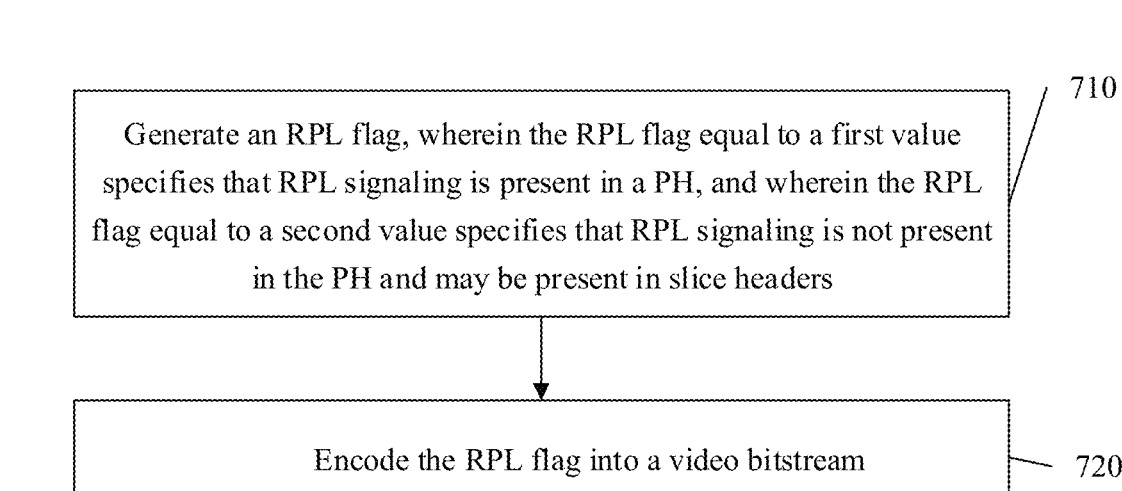
FIG. 7 is a flowchart illustrating a method of encoding a bitstream according to a first embodiment.

FIG. 7 is a flowchart illustrating a method 700 of encoding a bitstream according to a first embodiment. The encoder 300 may implement the method 700. At step 710, an RPL flag is generated. The RPL flag equal to a first value specifies that RPL signaling is present in a PH. The RPL flag equal to a second value specifies that RPL signaling is not present in the PH and may be present in slice headers. Finally, at step 730, the video bitstream is stored for communication toward a video decoder.

The method 700 may implement additional embodiments. For instance, the first value is 1. The second value is 0. An RPL SPS flag is generated, wherein the RPL SPS flag specifies that RPL i is derived based on one of ref_pic_list_struct(listIdx, rplsIdx) syntax structures with listIdx equal to i in an SPS or specifies that RPL i is derived based on one of ref_pic_list_struct(listIdx, rplsIdx) syntax structures with listIdx equal to i that is directly included. An RPL index is generated, wherein the RPL index specifies an index, into a list of ref_pic_list_struct(listIdx, rplsIdx) syntax structures with listIdx equal to i included in a sequence parameter set (SPS), of a ref_pic_list_struct(listIdx, rplsIdx) syntax structure with listIdx equal to i that is used for derivation of RPL i of a current picture.

Figure 8:
FIG. 8 is a flowchart illustrating a method of decoding a bitstream according to a second embodiment.
Figure 8:
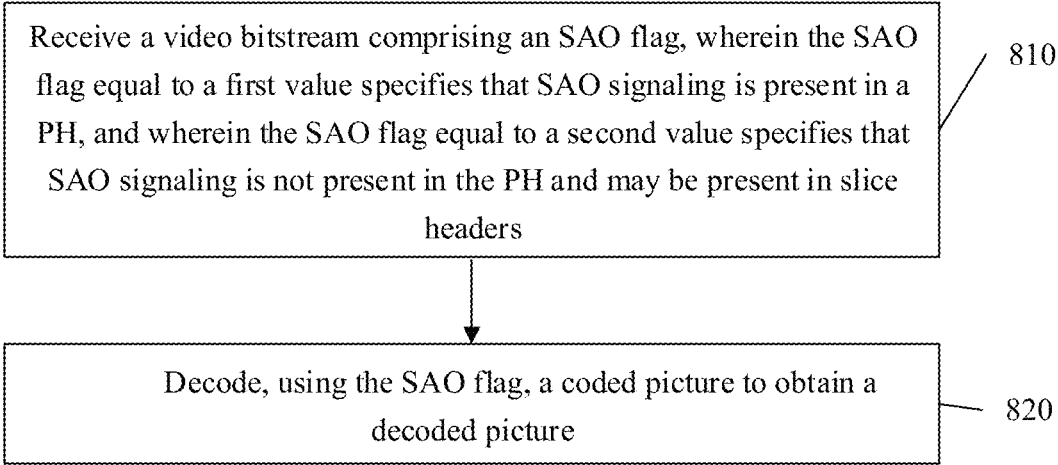

FIG. 8 is a flowchart illustrating a method 800 of decoding a bitstream according to a second embodiment. The decoder 400 may implement the method 800. At step 810, a video bitstream comprising an SAO flag is received. The SAO flag equal to a first value specifies that SAO signaling is present in a PH, and the SAO flag equal to a second value specifies that SAO signaling is not present in the PH and may be present in slice headers. Finally, at step 820, a coded picture is decoded using the SAO flag to obtain a decoded picture. The method 800 may implement additional embodiments. For instance, the decoded picture may be displayed on a display of an electronic device.

Figure 9:
FIG. 9 is a flowchart illustrating a method of encoding a bitstream according to a second embodiment.
Figure 9:
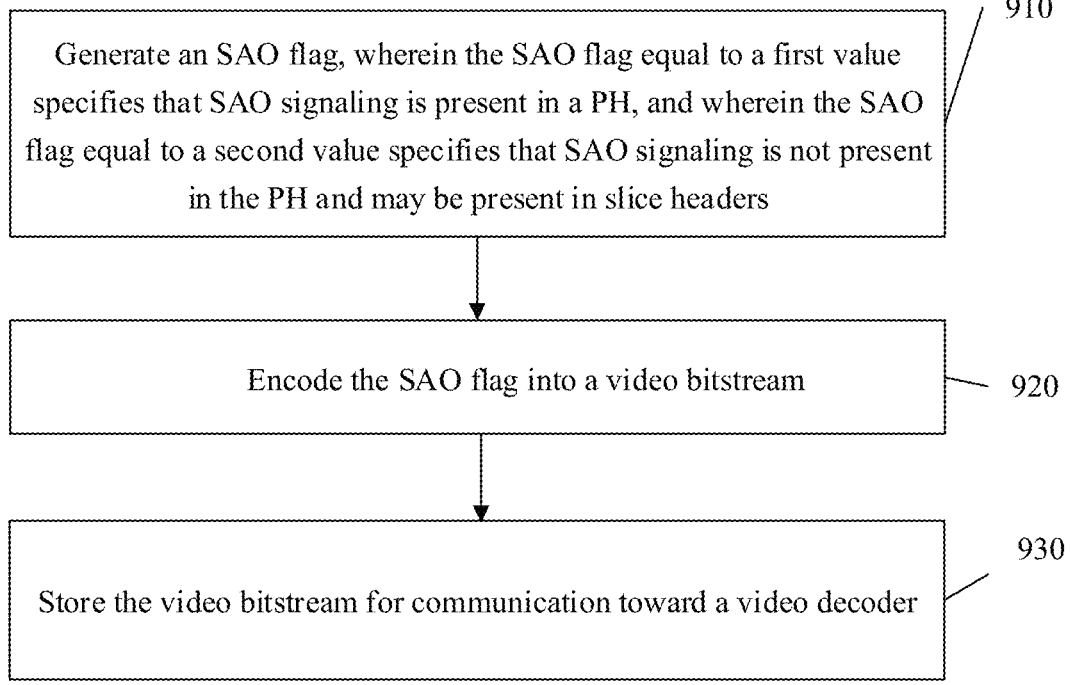

FIG. 9 is a flowchart illustrating a method 900 of encoding a bitstream according to a second embodiment. The encoder 300 may implement the method 900. At step 910, an SAO flag is generated. The SAO flag equal to a first value specifies that SAO signaling is present in a PH, and the SAO flag equal to a second value specifies that SAO signaling is not present in the PH and may be present in slice headers. At step 920, the RPL flag is encoded into a video bitstream.

Finally, at step 930, the video bitstream is stored for communication toward a video decoder.

Figure 10:
FIG. 10 is a flowchart illustrating a method of decoding a bitstream according to a third embodiment.
Figure 10:
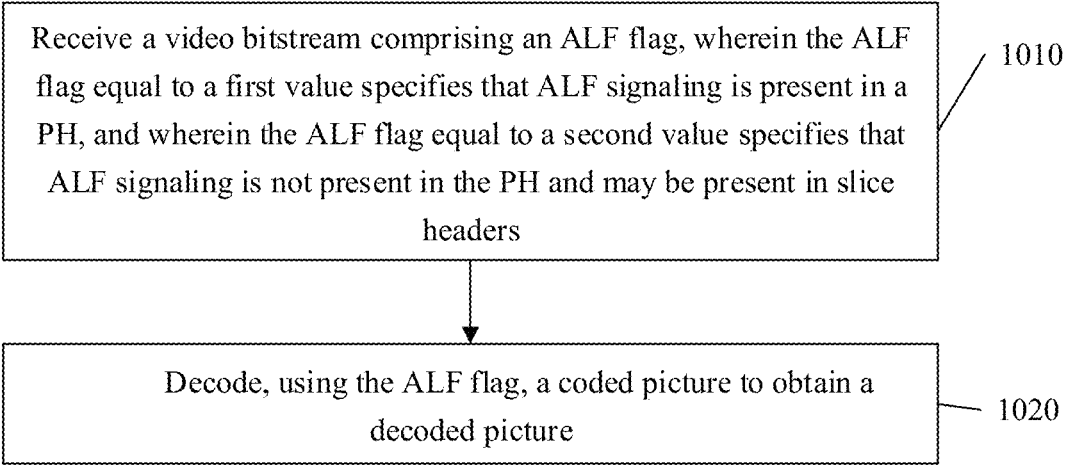

FIG. 10 is a flowchart illustrating a method 1000 of decoding a bitstream according to a third embodiment. The decoder 400 may implement the method 1000. At step 1010, a video bitstream comprising an ALF flag is received. The ALF flag equal to a first value specifies that ALF signaling is present in a PH, and the ALF flag equal to a second value specifies that ALF signaling is not present in the PH and may be present in slice headers. Finally, at step 1020, a coded picture is decoded using the ALF flag to obtain a decoded picture. The method 1000 may implement additional embodiments. For instance, the decoded picture may be displayed on a display of an electronic device.

Figure 11:
FIG. 11 is a flowchart illustrating a method of encoding a bitstream according to a third embodiment.
Figure 11:
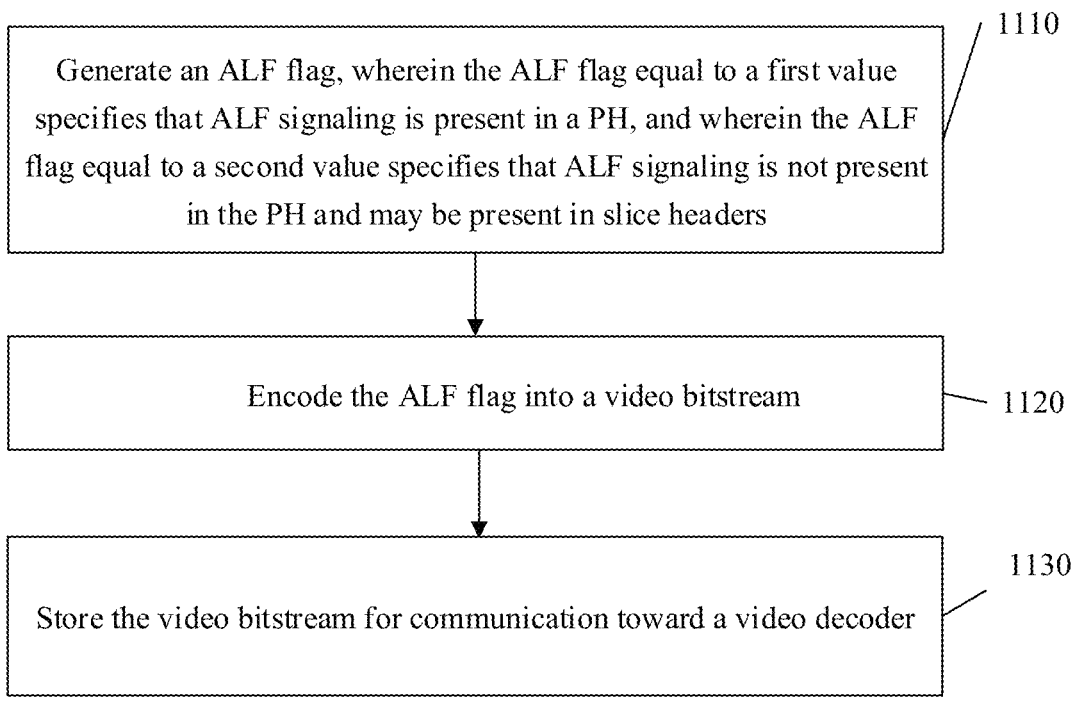

FIG. 11 is a flowchart illustrating a method 1100 of encoding a bitstream according to a third embodiment. The encoder 300 may implement the method 1100. At step 1110, an ALF flag is generated. The ALF flag equal to a first value specifies that ALF signaling is present in a PH, and the ALF flag equal to a second value specifies that ALF signaling is not present in the PH and may be present in slice headers. At step 1120, the ALF flag is encoded into a video bitstream. Finally, at step 1130, the video bitstream is stored for communication toward a video decoder.

Figure 12:
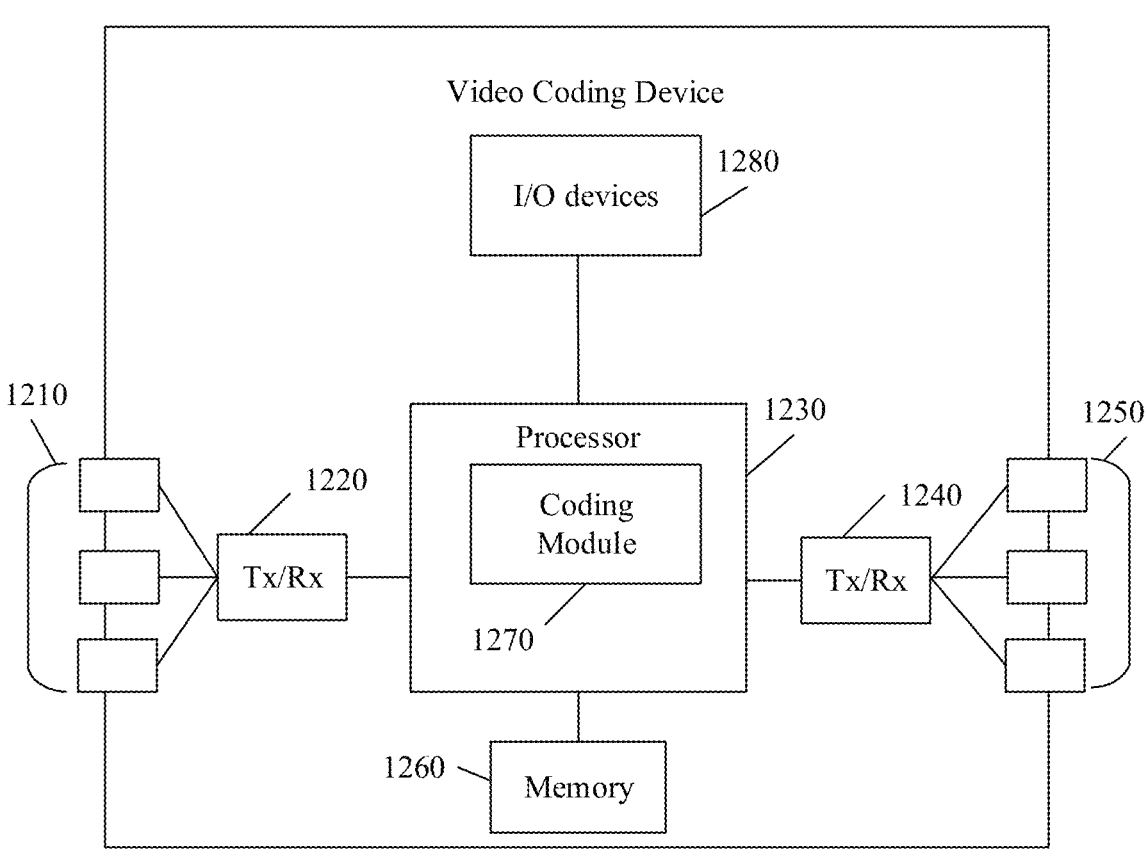
FIG. 12 is a schematic diagram of a video coding device.

FIG. 12 is a schematic diagram of a video coding device 1200 (e.g., a video encoder 300 or a video decoder 400) according to an embodiment of the disclosure. The video coding device 1200 is suitable for implementing the disclosed embodiments. The video coding device 1200 comprises ingress ports 1210 and an Rx 1220 for receiving data; a processor, logic unit, or CPU 1230 to process the data; a Tx 1240 and egress ports 1250 for transmitting the data; and a memory 1260 for storing the data. The video coding device 1200 may also comprise OE components and EO components coupled to the ingress ports 1210, the receiver units 1220, the transmitter units 1240, and the egress ports 1250 for egress or ingress of optical or electrical signals.

The processor 1230 is implemented by hardware and software. The processor 1230 may be implemented as one or more CPU chips, cores (e.g., as a multi-core processor), FPGAs, ASICs, and DSPs. The processor 1230 is in communication with the ingress ports 1210, Rx 120, Tx 1240, egress ports 1250, and memory 1260. The processor 1230 comprises a coding module 1270. The coding module 1270 implements the disclosed embodiments. For instance, the coding module 1270 implements, processes, prepares, or provides the various codec functions. The inclusion of the coding module 1270 therefore provides a substantial improvement to the functionality of the video coding device 1200 and effects a transformation of the video coding device 1200 to a different state. Alternatively, the coding module 1270 is implemented as instructions stored in the memory 1260 and executed by the processor 1230.

The video coding device 1200 may also include I/O devices 1280 for communicating data to and from a user. The I/O devices 1280 may include output devices such as a display for displaying video data, speakers for outputting audio data, etc. The I/O devices 1280 may also include input devices, such as a keyboard, mouse, or trackball, or corresponding interfaces for interacting with such output devices.

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be ROM, RAM, TCAM, or SRAM.

Figure 13:
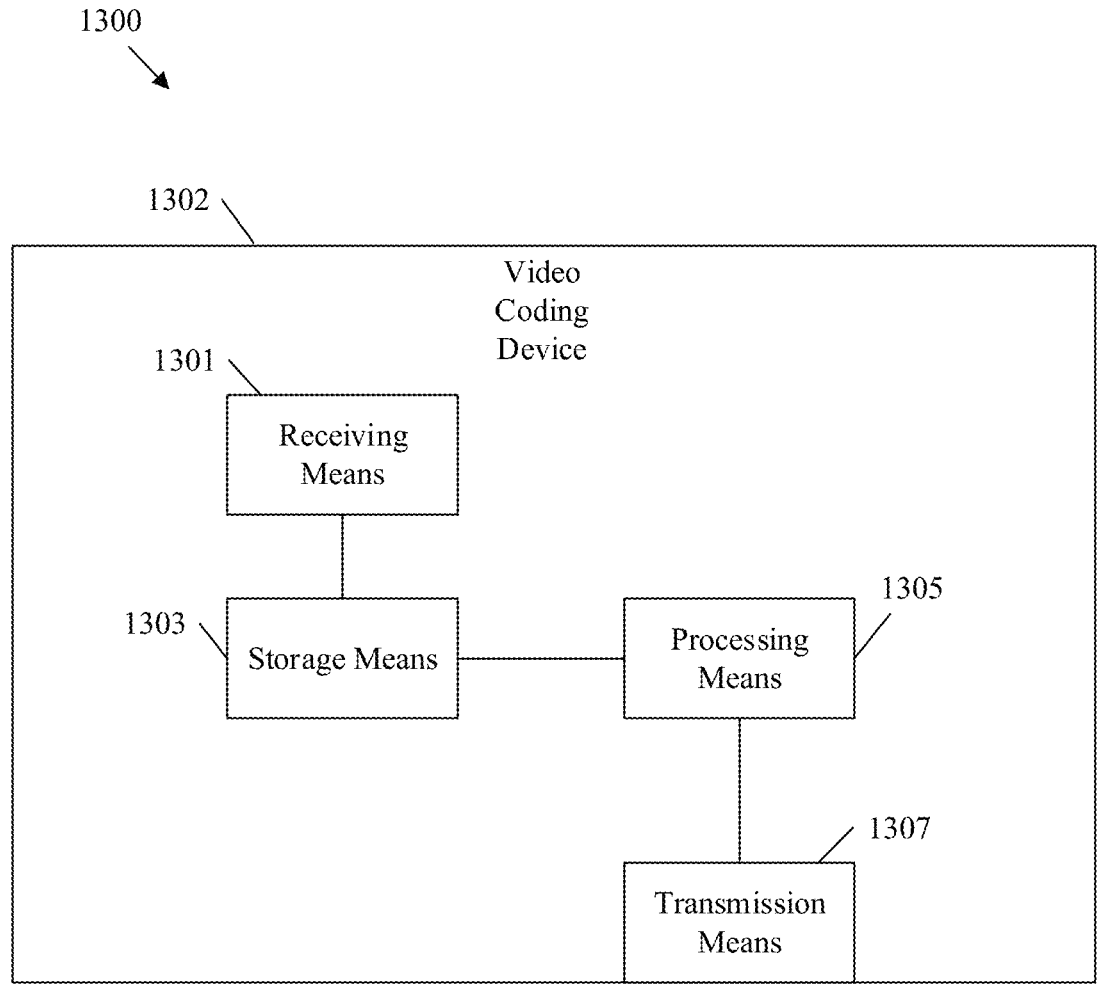
FIG. 13 is a schematic diagram of an embodiment of a means for coding.

FIG. 13 is a schematic diagram of an embodiment of a means for coding 1300. In an embodiment, the means for coding 1300 is implemented in a video coding device 1302 (e.g., the video encoder 300 or the video decoder 400). The video coding device 1302 includes receiving means 1301. The receiving means 1301 is configured to receive a picture to encode or to receive a bitstream to decode. The video coding device 1302 includes transmission means 1307 coupled to the receiving means 1301. The transmission means 1307 is configured to transmit the bitstream to a decoder or to transmit a decoded image to a display means (e.g., one of the I/O devices 1280).

The video coding device 1302 includes a storage means 1303. The storage means 1303 is coupled to at least one of the receiving means 1301 or the transmission means 1307. The storage means 1303 is configured to store instructions. The video coding device 1302 also includes processing means 1305. The processing means 1305 is coupled to the storage means 1303. The processing means 1305 is configured to execute the instructions stored in the storage means 1303 to perform the methods disclosed herein.

In an embodiment, a receiving means receives a video bitstream comprising an RPL flag. The RPL flag specifies that RPL signaling is present or not present in a PH or specifies that the RPL signaling may be present in slice headers. A processing means decodes a coded picture using the RPL flag to obtain a decoded picture.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A method comprising:
obtaining a video bitstream comprising a reference picture list (RPL) flag, wherein the RPL flag equal to a first value specifies that RPL signaling is present in a picture header (PH) and is not present in slice headers, wherein the RPL flag equal to a second value specifies that the RPL signaling is not present in the PH and may be present in the slice headers, wherein the RPL signaling is RPL information comprised in the video bitstream, wherein the RPL information comprises an RPL index or ref_pic_list_struct(listIdx, rplsIdx) syntax structure, wherein the RPL index specifies an index, into a list of the ref_pic_list_struct(listIdx, rplsIdx) syntax structures with listIdx equal to i included in a sequence parameter set (SPS), of the ref_pic_list_struct(listIdx, rplsIdx) syntax structure with listIdx equal to i that is used for derivation of RPL i of a current picture, wherein the video bitstream further comprises an adaptive loop filter (ALF) flag, wherein the ALF flag equal to the first value specifies that ALF signaling is present in the PH and not present in the slice headers, wherein the ALF flag equal to the second value specifies that the ALF signaling is not present in the PH and may be present in the slice headers, and wherein the ALF signaling comprises an ALF enable flag; and storing the video bitstream in at least one storage medium.

2. The method of claim 1, wherein the first value is 1.

3. The method of claim 1, wherein the second value is 0.

4. The method claim 1, wherein the video bitstream further comprises an RPL SPS flag.

5. The method of claim 4, wherein the RPL SPS flag specifies that RPL i is derived based on one of the ref_pic_list_struct(listIdx, rplsIdx) syntax structures with listIdx equal to i in an SPS or specifies that RPL i is derived based on one of the ref_pic_list_struct(listIdx, rplsIdx) syntax structures with listIdx equal to i that is directly included.

6. A non-transitory computer-readable storage medium storing instructions that, when executed by one or more processors, cause an apparatus to:

obtain a video bitstream comprising a reference picture list (RPL) flag, wherein the RPL flag equal to a first value specifies that RPL signaling is present in a picture header (PH) and is not present in slice headers, wherein the RPL flag equal to a second value specifies that the RPL signaling is not present in the PH and may be present in the slice headers, wherein the RPL signaling is RPL information comprised in the video bitstream, wherein the RPL information comprises an RPL index or ref_pic_list_struct(listIdx, rplsIdx) syntax structure, wherein the RPL index specifies an index, into a list of the ref_pic_list_struct(listIdx, rplsIdx) syntax structures with listIdx equal to i included in a sequence parameter set (SPS), of the ref_pic_list_struct(listIdx, rplsIdx) syntax structure with listIdx equal to i that is used for derivation of RPL i of a current picture, wherein the video bitstream further comprises an adaptive loop filter (ALF) flag, wherein the ALF flag equal to the first value specifies that ALF signaling is present in the PH and not present in the slice headers, wherein the ALF flag equal to the second value specifies that the ALF signaling is not present in the PH and may be present in the slice headers, and wherein the ALF signaling comprises an ALF enable flag; and store the video bitstream in at least one storage medium.

7. The non-transitory computer-readable storage medium of claim 6, wherein the first value is 1.

8. The non-transitory computer-readable storage medium of claim 6, wherein the second value is 0.

9. The non-transitory computer-readable storage medium of claim 6, wherein the video bitstream further comprises an RPL SPS flag.

10. The non-transitory computer-readable storage medium of claim 9, wherein the RPL SPS flag specifies that RPL i is derived based on one of the ref_pic_list_struct(listIdx, rplsIdx) syntax structures with listIdx equal to i in an SPS or specifies that RPL i is derived based on one of the ref_pic_list_struct(listIdx, rplsIdx) syntax structures with listIdx equal to i that is directly included.

11. A coding device comprising:

a communication interface configured to receive or transmit a video bitstream comprising a reference picture list (RPL) flag, wherein the RPL flag equal to a first value specifies that RPL signaling is present in a picture header (PH) and is not present in slice headers, wherein the RPL flag equal to a second value specifies that the RPL signaling is not present in the PH and may be present in the slice headers, wherein the RPL signaling is RPL information comprised in the video bitstream, wherein the RPL information comprises an RPL index or ref_pic_list_struct(listIdx, rplsIdx) syntax structure, wherein the RPL index specifies an index, into a list of the ref_pic_list_struct(listIdx, rplsIdx) syntax structures with listIdx equal to i included in a sequence parameter set (SPS), of the ref_pic_list_struct(listIdx, rplsIdx) syntax structure with listIdx equal to i that is used for derivation of RPL i of a current picture, wherein the video bitstream further comprises an adaptive loop filter (ALF) flag, wherein the ALF flag equal to the first value specifies that ALF signaling is present in the PH and not present in the slice headers, wherein the ALF flag equal to the second value specifies that the ALF signaling is not present in the PH and may be present in the slice headers, and wherein the ALF signaling comprises an ALF enable flag; and one or more memories coupled to the communication interface and configured to store the video bitstream.

12. The coding device of claim 11, wherein the first value is 1.

13. The coding device of claim 11, wherein the second value is 0.

14. The coding device of claim 11, wherein the video bitstream further comprises an RPL SPS flag.

15. The coding device of claim 14, wherein the RPL SPS flag specifies that RPL i is derived based on one of the ref_pic_list_struct(listIdx, rplsIdx) syntax structures with listIdx equal to i in an SPS or specifies that RPL i is derived based on one of the ref_pic_list_struct(listIdx, rplsIdx) syntax structures with listIdx equal to i that is directly included.

16. A method comprising:

storing a video bitstream in one or more memories, wherein the video bitstream comprises a reference picture list (RPL) flag, wherein the RPL flag equal to a first value specifies that RPL signaling is present in a picture header (PH) and is not present in slice headers, wherein the RPL flag equal to a second value specifies that the RPL signaling is not present in the PH and may be present in the slice headers, wherein the RPL signaling is RPL information comprised in the video bitstream, wherein the RPL information comprises an RPL index or ref_pic_list_struct(listIdx, rplsIdx) syntax structure, wherein the RPL index specifies an index, into a list of the ref_pic_list_struct(listIdx, rplsIdx) syntax structures with listIdx equal to i included in a sequence parameter set (SPS), of the ref_pic_list_struct (listIdx, rplsIdx) syntax structure with listIdx equal to i that is used for derivation of RPL i of a current picture, wherein the video bitstream further comprises an adaptive loop filter (ALF) flag, wherein the ALF flag equal to the first value specifies that ALF signaling is present in the PH and not present in the slice headers, wherein the ALF flag equal to the second value specifies that the ALF signaling is not present in the PH and may be present in the slice headers, and wherein the ALF signaling comprises an ALF enable flag;

obtaining the video bitstream from the one or more memories; and transmitting the video bitstream to a destination device.

17. The method of claim 16, wherein the first value is 1.

18. The method of claim 16, wherein the second value is 0.

19. The method of claim 16, wherein the video bitstream further comprises an RPL SPS flag.

20. The method of claim 19, wherein the RPL SPS flag specifies that RPL i is derived based on one of the ref_pic_list_struct(listIdx, rplsIdx) syntax structures with listIdx equal to i in an SPS or specifies that RPL i is derived based on one of the ref_pic_list_struct(listIdx, rplsIdx) syntax structures with listIdx equal to i that is directly included.

* * * * *